(12) United States Patent
Ebihara et al.

(10) Patent No.: US 8,899,381 B2
(45) Date of Patent: Dec. 2, 2014

(54) ELECTRIC TRANSAXLE

(75) Inventors: Tomoyuki Ebihara, Amagasaki (JP);
Hiroaki Hashima, Amagasaki (JP);
Kengo Sasahara, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 262 days.

(21) Appl. No.: 13/356,337

(22) Filed: Jan. 23, 2012

(65) Prior Publication Data

US 2013/0019707 A1    Jan. 24, 2013

(30) Foreign Application Priority Data

Jan. 24, 2011    (JP) ................................. 2011-012151

(51) Int. Cl.
*F16H 57/04* (2010.01)
*B60K 7/00* (2006.01)
*B60K 1/00* (2006.01)

(52) U.S. Cl.
CPC ......... *B60K 7/0007* (2013.01); *B60K 2001/003* (2013.01); *B60K 2001/001* (2013.01)
USPC ...................................................... 184/6.12

(58) Field of Classification Search
USPC .......................................... 184/6.12; 74/648
See application file for complete search history.

(56) References Cited

U.S. PATENT DOCUMENTS

| | | | | |
|---|---|---|---|---|
| 3,529,698 | A * | 9/1970 | Nelson ........................... | 184/6.12 |
| 4,721,184 | A * | 1/1988 | Sowards ....................... | 184/6.12 |
| 7,059,443 | B2 * | 6/2006 | Kira ............................... | 180/243 |
| 7,867,132 | B2 * | 1/2011 | Ishii et al. ..................... | 475/293 |
| 8,074,753 | B2 * | 12/2011 | Tahara et al. ................. | 180/65.21 |
| 8,261,883 | B2 * | 9/2012 | Ariga et al. ................... | 184/13.1 |
| 8,534,425 | B2 * | 9/2013 | Jabs et al. ..................... | 184/11.1 |
| 8,602,935 | B2 * | 12/2013 | Katoh et al. .................. | 475/159 |
| 8,657,073 | B2 * | 2/2014 | Matsumoto et al. ......... | 184/11.1 |
| 2008/0234092 | A1 * | 9/2008 | Ishii et al. ..................... | 475/275 |
| 2009/0045026 | A1 * | 2/2009 | Ishii et al. ..................... | 192/87.14 |

(Continued)

FOREIGN PATENT DOCUMENTS

| | | |
|---|---|---|
| EP | 1 995 143 | 11/2008 |
| JP | 09-226394 | 9/1997 |

(Continued)

OTHER PUBLICATIONS

European Search Report for European Application No. EP 12 15 0438, European Patent Office, dated Jun. 5, 2012, 4 pgs.

(Continued)

*Primary Examiner* — William A Rivera
*Assistant Examiner* — Michael Riegelman
(74) *Attorney, Agent, or Firm* — Sterne, Kessler, Goldstein & Fox, P.L.L.C.

(57) ABSTRACT

An electric transaxle according to the invention comprises a transaxle casing, an electric motor, an axle, a gear mechanism, first and second fluid sumps, and first and second fluid introduction passages. The transaxle casing defines a gear chamber therein. The electric motor includes a motor casing attached to the transaxle casing. The axle is supported by the transaxle casing. The gear mechanism transmits power from the electric motor to the axle. Fluid of the first fluid sump raised by driving the gear mechanism is supplied to the second fluid sump. The first fluid introduction passage introduces the fluid raised from the first fluid sump to the second fluid sump when the axle is rotated in a forward traveling direction. The second fluid introduction passage introduces the fluid raised from the first fluid sump to the second fluid sump when the axle is rotated in a backward traveling direction.

8 Claims, 13 Drawing Sheets

(56) References Cited

U.S. PATENT DOCUMENTS

| | | | |
|---|---|---|---|
| 2010/0236845 A1* | 9/2010 | Ishii et al. | 180/65.6 |
| 2011/0192245 A1* | 8/2011 | Shioiri et al. | 74/467 |
| 2011/0319215 A1* | 12/2011 | Katoh et al. | 475/149 |

FOREIGN PATENT DOCUMENTS

| | | |
|---|---|---|
| JP | 2005-201316 | 7/2005 |
| JP | 2009-118558 | 5/2009 |
| WO | WO 2010/100541 | 9/2010 |

OTHER PUBLICATIONS

Office Action for a Japanese Application No. 2011-012151, issued Sep. 16, 2014, with English translation, 4 pages.

English language Abstract for JP 2009-118558.

* cited by examiner ary
ELECTRIC TRANSAXLE

BACKGROUND OF THE INVENTION

1. Field of the Invention

The present invention relates to an electric transaxle including an axle, an electric motor for driving the axle, a gear mechanism for transmitting power front the electric motor to the axle, and a transaxle casing incorporating the gear mechanism.

2. Related Art

Conventionally, as disclosed by JP H09-226394 A, there is a well-known electric transaxle including an axle, an electric motor for driving the axle, a gear mechanism for transmitting power from the electric motor to the axle, and a transaxle casing incorporating the gear mechanism. The transaxle casing defines a gear chamber incorporating the gear mechanism, and fluid for lubricating the gear mechanism is accumulated in a bottom portion of the gear chamber so as to serve as a fluid sump (hereinafter, referred to as "first fluid sump"), and the gear mechanism is submerged in the first fluid sump. Further, the transaxle casing is provided in an upper portion with another fluid sump (hereinafter referred to as "second fluid sump") supplied with fluid that is raised and splashed from the first fluid sump by rotating gears of the gear mechanism. The electric motor is externally mounted on the transaxle casing so as to define a motor chamber incorporating component elements of the electric motor, such as a stator and a rotor, and fluid is supplied from the second fluid sump into the motor chamber so as to cool the electric motor.

In the above-mentioned conventional electric transaxle, the motor chamber is used as a third fluid sump for adjusting a level of the first fluid sump in height by supply or discharge of fluid to and from the motor chamber. In this regard, when the vehicle is stationary, the gears are not rotated to raise and splash fluid of the first fluid sump, whereby the level of the first fluid sump has a sufficient height so that the gear mechanism is sufficiently submerged in the first fluid sump so as to be ready for starting the vehicle. On the other hand, during travel of the vehicle, fluid of the first fluid sump is raised and splashed by rotating the gears and is stored in the second fluid sump of the transaxle casing and in the third fluid sump of the motor chamber, thereby lowering the level of the first fluid sump, and reducing resistance of the first fluid sump to stirring of the gears. Accordingly, the submergence depth of the gear mechanism in the first fluid sump is reduced, however, the rotating gears stir the first fluid sump so as to supply fluid from the first fluid sump to all the corners of the gear mechanism, thereby ensuring sufficient lubrication of the gear mechanism.

The transaxle casing is formed with a structure for smoothly guiding the fluid raised and splashed from the first fluid sump to the second fluid sump. However, this structure is available for only guiding fluid splashed by the gears rotating in one direction for forward traveling of the vehicle. The structure is not configured to ensure smooth introduction of fluid from the first fluid sump to the second fluid sump when the gears rotate in the other direction for backward traveling of the vehicle, because the electric transaxle is designed to be adapted to ordinary motorcars that do not often travel backward. If the electric transaxle is adapted to a working vehicle that often reverses its traveling direction, fluid raised and splashed by the gears rotating in the direction for backward traveling of the vehicle is insufficiently supplied to the second fluid sump, thereby insufficiently lowering the level of the first fluid sump for reducing resistance of the first fluid sump to stirring of the gears, and thereby insufficiently supplying the motor chamber with fluid for cooling the electric motor from the second fluid sump.

Further, in the above-mentioned conventional electric transaxle, the fluid passage for supplying fluid from the second fluid sump to the motor chamber includes a portion defined by the electric motor, however, this portion includes a fluid passage formed in a motor shaft serving as an output shaft of the electric motor, thereby being complicated, increasing costs, and deteriorating maintenanceability.

Further, the above-mentioned conventional electric transaxle is limitative in arrangement because the mounting direction of the electric motor and the arrangement of the first and second fluid sumps are limitative. Therefore, if a different arrangement of the electric motor relative to the transaxle casing or relative to the axles is desired, an additional different die or member must be prepared, thereby increasing costs. Furthermore, the electric transaxle is desired to reduce costs because it must have an expensive electric motor.

BRIEF SUMMARY OF THE INVENTION

An object of the present invention is to provide an electric transaxle configured so that lubricating fluid raised and splashed by gears is effectively supplied to a motor chamber of an electric motor so as to cool the electric motor and so as to sufficiently lower a level of a lubricating fluid sump having the gears submerged therein, regardless of whether the gears rotate in a direction for forward traveling of a vehicle or in another direction for backward traveling of the vehicle.

To achieve this object, an electric transaxle according to the invention comprises a transaxle casing, an electric motor, an axle, a gear mechanism, first and second fluid sumps, and first and second fluid introduction passages. The transaxle casing defines a gear chamber therein. The electric motor includes a motor casing attached to the transaxle casing. The motor casing defines a motor chamber therein. A component of the electric motor is disposed in the motor chamber. The axle is supported by the transaxle casing. The gear mechanism is disposed in the gear chamber so as to transmit power from the electric motor to the axle. The first fluid sump is provided in the gear chamber. At least a part of the gear mechanism is submerged in the first fluid sump. Fluid of the first fluid sump raised by driving the gear mechanism is supplied to the second fluid sump. The first fluid introduction passage is used to introduce the fluid raised from the first fluid sump to the second fluid sump when the axle is rotated in a forward traveling direction. The second fluid introduction passage is used to introduce the fluid raised from the first fluid sump to the second fluid sump when the axle is rotated in a backward traveling direction.

Therefore, due to the first and second fluid introduction passages, the electric transaxle is applicable to a working vehicle, such as a lawn mower, which often reverses forward and backward traveling directions, because fluid raised and splashed by gears from the first fluid sump can be supplied to the second fluid sump and to the motor chamber regardless of whether the vehicle travels forward or backward. In other words, during either forward or backward traveling of the vehicle, a level of the first fluid sump is sufficiently lowered to reduce resistance to stirring of gears of the gear mechanism, thereby reducing power loss, and thereby sufficiently reducing a temperature increase of the first fluid sump so as to ensure sufficient lubrication of the gear mechanism.

Preferably, the transaxle casing and the motor casing are formed so as to supply fluid of the second fluid sump to the motor chamber, and so as to return fluid from the motor chamber to the first fluid sump.

Therefore, the motor chamber is supplied with fluid for cooling the electric motor and is prevented from being excessively supplied with the fluid due to the returning of fluid to the first fluid sump. The structure for supply and return of fluid to and from the motor chamber requires forming no member in addition of the transaxle casing and the motor casing, thereby being simplified and thereby reducing the number of parts and costs.

Preferably, the motor casing has a fluid passage for supplying fluid from the second fluid sump to the motor chamber or for returning fluid from the motor chamber to the first fluid sump, and the fluid passage is formed in only an end portion of the motor casing directly attached to the transaxle casing.

Therefore, only the end portion of the motor casing must be formed to define the fluid passage, thereby simplifying the electric motor, reducing the number of parts and costs, and facilitating maintenance of the electric motor.

Preferably, the transaxle casing includes symmetric portions such that either one of the symmetric portions of the transaxle casings define a lower portion of the gear chamber for providing the first fluid sump. The electric transaxle includes symmetric reservoirs such that either one of the symmetric reservoirs serves as the second fluid sump. The electric transaxle includes symmetric guides, each of which defines the first and second introduction fluid passages, such that either one of the symmetric guides is used for introducing fluid raised from the first fluid sump to the second fluid sump.

Therefore, due to the symmetric portions of the transaxle casing, the symmetric reservoirs and the symmetric guides, the first and second fluid sumps and the first and second fluid introduction passages can be ensured by only selecting whether the transaxle casing is reversed or not so as to correspond to various arrangements and designs of the electric transaxle, thereby standardizing the transaxle casing so as to reduce the number of dies and component members, and thereby reducing costs for manufacturing and inventory control.

Preferably, the transaxle casing and the motor casing are formed with symmetric fluid passages such that one of the symmetric fluid passages is used for supplying fluid of the second fluid sump to the motor chamber, and such that the other of the symmetric fluid passages is used for returning fluid from the motor chamber to the first fluid sump.

Therefore, due to the symmetric fluid passages, both the fluid passage for supplying fluid from the second fluid sump to the motor chamber and the fluid passage for returning fluid from the motor chamber to the first fluid sump can be ensured by only selecting whether the transaxle casing having the motor casing attached thereto is reversed or not so as to correspond to various arrangements and designs of the electric transaxle, thereby standardizing the transaxle casing and the motor casing so as to reduce the number of dies and component members, and thereby reducing costs for manufacturing and inventory control.

Preferably, portions of the symmetric fluid passages defined by the motor casing are formed in only an end portion of the motor casing directly attached to the transaxle casing.

Therefore, only the end portion of the motor casing must be formed to define the fluid passages, thereby simplifying the electric motor, reducing the number of parts and costs, and facilitating maintenance of the electric motor.

Preferably, the symmetric portions of the transaxle casing, the symmetric reservoirs and the symmetric guides are symmetric with respect to a horizontal plane of symmetry.

Therefore, the electric transaxle can be vertically reversed front to rear or right to left to have a different arrangement of the electric motor, the axle, or the like, so as to correspond to various designed vehicles, while ensuring the first and second fluid sumps, the first and second fluid introduction passages and the fluid supply and return passages between the first and second fluid sumps via the motor chamber regardless of the vertical reverse of the electric transaxle.

Preferably, the axle extends outward from only one of right and left side portions of the transaxle casing.

Therefore, the electric transaxle can be paired so as to be adapted to a vehicle that is equipped with right and left transaxles for driving respective right and left axles so as to enable zero-turn of the vehicle. In this regard, one of the paired electric transaxles is arranged to extend the axle rightwardly outward from the right portion of the transaxle casing so as to serve as the right transaxle for driving the right axle of the vehicle, and the other electric transaxle is arranged to extend the axle leftwardly outward from the left portion of the transaxle casing so as to serve as the left transaxle for the left axle of the vehicle. The right transaxle corresponds to the left transaxle vertically reversed right to left. Further, both the right and left transaxles ensure the respective first and second fluid sumps and the respective first and second fluid introduction passages. As a result, standardization of the electric transaxle is progressed so as to reduce the number of dies and component members, thereby reducing costs for manufacturing and inventory control.

Preferably, the transaxle casing has opposite side portions, and the electric motor is selectively attached to one of the opposite side portions of the transaxle casing so as to be drivingly connected to the gear mechanism.

Therefore, the driving connection of the electric motor to the gear mechanism can be ensured by only selecting whether the electric motor is attached to the right or left side portion of the transaxle casing so as to correspond to various arrangements and designs of the electric transaxle, thereby standardizing the transaxle casing so as to reduce the number of dies and component members, and thereby reducing costs for manufacturing and inventory control.

These, further and other objects, features and advantages of the invention will appear more fully from the following description with reference to drawings.

DETAILED DESCRIPTION OF THE INVENTION

Figure 1:
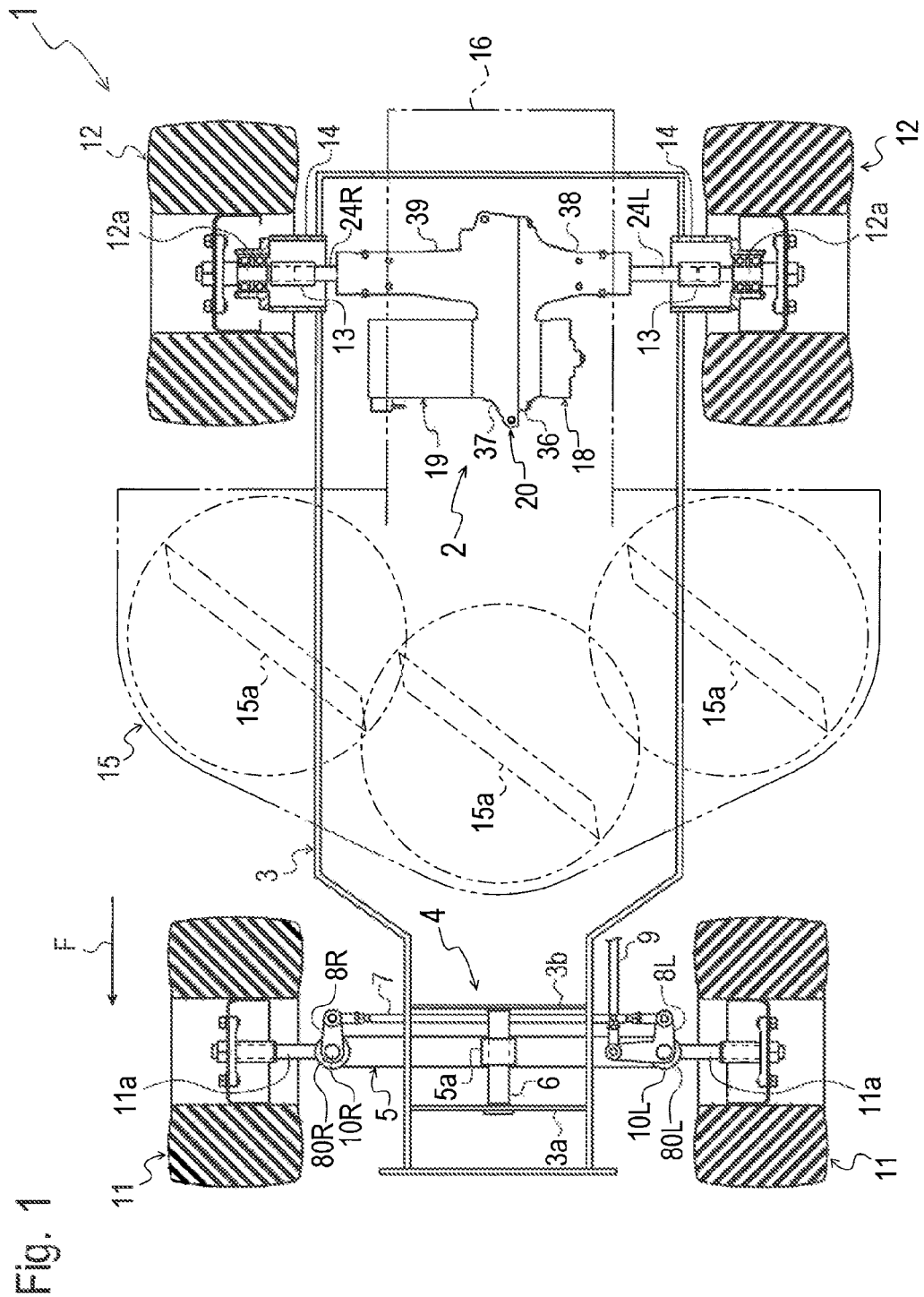
FIG. 1 is a schematic plan view of a working vehicle (a lawn mower) 1 equipped with an electric transaxle 2.

Some embodiments will be described hereinafter on an assumption that arrows F in some drawings are directed forward so as to correspond to the forward traveling direction of a vehicle 1 as shown in FIG. 1.

Figure 2:
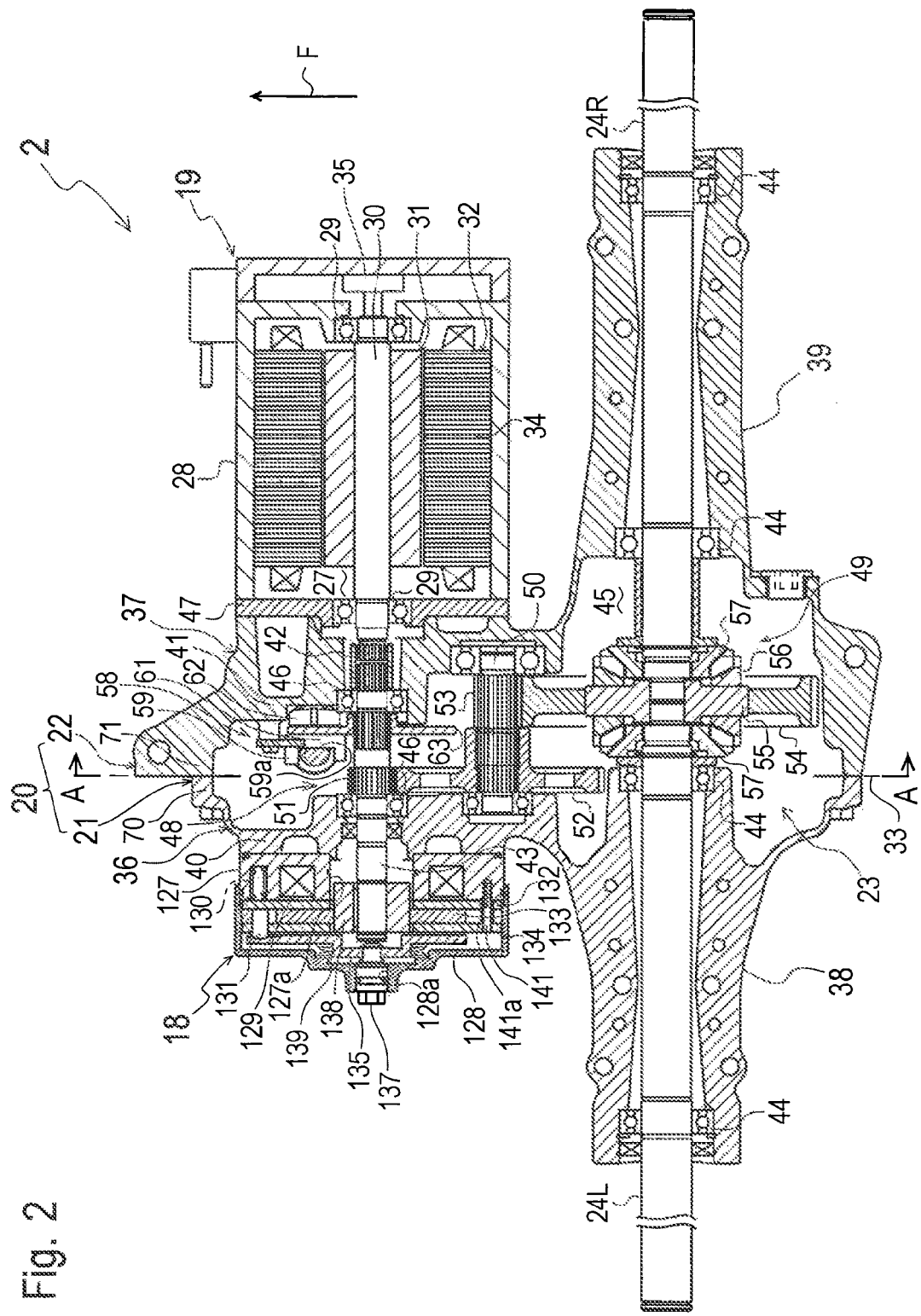
FIG. 2 is a sectional plan view of electric transaxle 2 including a transaxle casing 20, left and right axles 24L and 24R, an electric motor 19 and a parking brake unit 18.

A general structure of vehicle 1 equipped with an electric transaxle (hereinafter, simply referred to "transaxle") 2 will be described with reference to FIGS. 1 and 2. Vehicle 1 is a riding lawn mower, serving as a typical working vehicle, and having a vehicle body frame 3 extended in the fore-and-aft direction of vehicle 1. A front potion of vehicle body frame 3 supports an axle supporter 4 supporting right and left front wheels 11. A rear portion of vehicle body frame 3 supports transaxle 2 supporting right and left rear wheels 12.

Vehicle 1 is equipped with a mower deck 15 between front axle supporter 4 and rear transaxle 2. Mower deck 15 accommodates at least one rotary blade 15a (in this embodiment, three rotary blades 15a). A duct 16 for discharging grass mowed by rotary blade or blades 15a is extended rearward from mower deck 15 above transaxle 2, and is connected at a rear end thereof to a grass tank (not shown) so that the mowed grass is collected in the grass tank. The at least one rotary blade 15a may be driven by power of a later-discussed electric motor 19 of transaxle 2.

Axle supporter 4 will be described. Axle supporter 4 includes an axle casing 5, a pivot pin 6, a tie rod 7, and knuckle arms 8R and 8L. The front portion of vehicle body frame 3 has a front cross member 3a and a rear cross member 3b. Pivot pin 6 is extended in the fore-and-aft direction of vehicle 1 and is spanned between front cross member 3a and rear cross member 3b. A boss 5a is fixed or formed on a laterally middle upper portion of axle casing 5, and is pivoted on pivot pin 6, so that axle casing 5 is vertically swingable at right and left ends thereof centered on pivot pin 6. Therefore, during traveling of vehicle 1, right and left front wheels 11 are allowed to move vertically along roughness of a field so as to moderate pitching of vehicle body frame 3 and mower deck 15.

A right kingpin casing 80R is provided on a right end of axle casing 5 so as to support an axle 11a of right front wheel 11 and to support a right kingpin 10R. A right knuckle arm 8R is provided on right kingpin 10R above right kingpin casing 80R so that right front wheel 11 can horizontally turn relative to axle casing 5 according to rotation of right knuckle arm 8R. A left kingpin casing 80L is provided on a left end of axle casing 5 so as to support an axle 11a of left front wheel 11 and to support a left kingpin 10L. A left knuckle arm 8L is provided on left kingpin 10L above left kingpin casing 80L so that left front wheel 11 can horizontally turn relative to axle casing 5 according to rotation of left knuckle arm 8L.

Right and left knuckle arms 8R and 8L are extended rearward from respective kingpins 10R and 10L, and are pivotally connected to each other via tie rod 7. One of right and left knuckle arms 8R and 8L (in this embodiment, left knuckle arm 8L) is L-shaped so as to be pivotally connected to a link rod 9 extended from a steering manipulator (not shown), such as a steering wheel. Therefore, when the steering manipulator is manipulated, link rod 9 moves forward or rearward so as to rotate L-shaped knuckle arm 8L, and so as to move tie rod 7, thereby rotating the other knuckle arm 8R, whereby right and left front wheels 11 turn rightward or leftward according to the manipulation of the steering manipulator.

Transaxle 2 includes a transaxle casing 20, right and left axles 24R and 24L supported by transaxle casing 20, and an electric motor 19 mounted on transaxle casing 20 so as to drive right and left axles 24R and 24L. Right and left axles 24R and 24L project rightwardly and leftwardly outward from right and left ends of transaxle casing 20, respectively, and are inserted at respective distal ends thereof into respective right and left joint sleeves 13. To the rear portion of vehicle body frame 3 are fixed right and left axle support members 14, which accommodate respective right and left axles 24R and 24L and respective right and left joint sleeves 13. Right and left rear wheels 12 have respective axles 12a serving as center axial shafts of respective rear wheels 12. Right and left axles 12a are journalled by respective right and left axle support members 14 via respective bearings, and are inserted into respective right and left shaft joint sleeves 13 so as to be rotatably integrated with respective right and left axles 24R and 24L. Axles 24R, 24L and 12a are spline-fitted in respective shaft joint sleeves 13, for example.

Transaxle 2 will be described in detail with reference to FIGS. 2 to 5. In the illustrated embodiment, a front portion of transaxle casing 20 has a parking brake unit 18 mounted on a left side surface thereof, and has electric motor 19 mounted on a right side surface thereof, while a rear portion of transaxle casing 20 supports right and left axles 24R and 24L. Transaxle casing 20 incorporates a gear mechanism 23 for transmitting power of electric motor 19 to axles 24R and 24L.

Hereinafter, description of transaxle 2 regarding directions and positions is based on the assumption that transaxle casing 20, parking brake unit 18, electric motor 19 and right and left axles 24R and 24L are arranged as mentioned above, excluding some special cases. However, it should be noted that this is only a representative arrangement of transaxle 2, and various arrangements of transaxle 2 are allowed. In this regard, each of parking brake unit 18 and electric motor 19 may be mounted on either the right or left side surface of the front portion of transaxle casing 20. Alternatively, transaxle 2 may be arranged so as to have axles 24R and 24L supported by the front portion thereof, and so as to have parking brake unit 18 and electric motor 19 mounted on the rear portion thereof.

Electric motor 19 includes a cylindrical motor casing 28, a motor shaft 30, a rotor 31 and a stator 32. Hereinafter, an end portion of motor casing 28 attached to transaxle casing 20, i.e., a left end portion of motor casing 28 in the illustrated embodiment, is referred to as a "proximal end portion" of motor casing 28, and another opposite end portion of motor casing 28, i.e., a right end portion of motor casing 28 in the illustrated embodiment, is referred to as a "distal end portion" of motor casing 28. Motor shaft 30 is extended laterally horizontally in parallel to axles 24R and 24L, and is journalled by motor casing 28 via right and left bearings 29, so as to have an axial end (i.e., a right end in the illustrated embodiment, hereinafter referred to as a "distal end" of motor shaft 30) in motor casing 28 and so as to have another axial end (i.e., a left end in the illustrated embodiment, hereinafter referred to as a "proximal end" of motor shaft 30) in transaxle casing 20.

Motor casing 28 has an inner space defined as a motor chamber 27. Motor shaft 30 is passed through motor chamber 27 between right and left bearings 29. Rotor 31 is fixedly provided on an outer peripheral surface thereof with a permanent magnet, and is fixed on motor shaft 30 in motor chamber 27. Stator 32 is disposed in motor chamber 27 so as to surround rotor 31. Stator 32 includes armature windings 34, which are fixed on an inner peripheral surface of motor casing 28 defining motor chamber 27 so as to face the outer peripheral surface of rotor 31 with the permanent magnet.

Electric motor 19 is a brush-less motor provided with a rotary angle sensor 35. Rotary angle sensor 35 is fixed onto an inside of the distal end portion of motor casing 28 so as to face the distal end of motor shaft 30 projecting outward from one bearing 29 (in this embodiment, right bearing 29). Rotary angle sensor 35 detects a rotary angle of motor shaft 30, thereby detecting an actual position of the permanent magnet on rotor 31 for controlling an inverter of electric motor 19. On the other hand, the proximal end of motor shaft 30 projects into transaxle casing 20 from the other bearing 29 (in this embodiment, left bearing 29) in a base end plate 47 defining the proximal end portion of motor casing 28.

Transaxle casing 20 is configured by joining left and right casing halves 21 and 22 to each other at a vertical joint plane 33. Casing half 21 has a later-discussed sidewall 40 that is available to have parking brake unit 18 mounted thereon, and casing half 22 has a later-discussed sidewall 41 that is available to have electric motor 19 mounted thereon. On the above-mentioned assumption that parking brake unit 18 is disposed on the left side of transaxle casing 20 and electric motor 19 is disposed on the right side of transaxle casing 20, casing half 21 serves as a left casing half of transaxle casing 20, and casing half 22 serves as a right casing half of transaxle casing 20. Left casing half 21 is formed with a left gear housing portion 36 for accommodating gear mechanism 23, and is formed with a left axle supporting portion 38 extended rearward and leftward from left gear housing portion 36 so as to support left axle 24L via bearings 44. Right casing half 22 is formed with a right gear housing portion 37 for accommodating gear mechanism 23, and is formed with a right axle supporting portion 39 extended rearward and rightward from right gear housing portion 37 so as to support right axle 24R via other bearings 44.

Left and right casing halves 21 and 22 are joined to each other at vertical joint plane 33 so as to constitute transaxle casing 20 having a gear chamber 45 therein for accommodating gear mechanism 23. Left gear housing portion 36 is formed with sidewall 40 defining a left end of gear chamber 45, and is formed with a flange 70 surrounding sidewall 40 so as to define vertical joint plane 33. Right gear housing portion 37 is formed with sidewall 41 defining a right end of gear chamber 45, and is formed with a flange 71 surrounding sidewall 41 so as to define vertical joint plane 33. In other words, flanges 70 and 71 have surfaces to be joined to each other so as to define vertical joint plane 33 for joining left and right casing halves 21 and 22 to each other. Sidewall 41 has an outer side surface to which above-mentioned base end plate 47 of electric motor 19 is attached, and sidewall 40 has an outer side surface to which a later-discussed support block 127 of parking brake unit 18.

Fluid for lubricating gear mechanism 23 and for cooling electric motor 19 is stored in a lower portion of gear chamber 45 so as to serve as a first fluid sump 25. In this regard, transaxle casing 20 includes an upper portion 20a defining the ceiling of gear chamber 45 and includes a lower portion 20aA defining the bottom of gear chamber 45. First fluid sump 25 is provided along lower portion 20aA of transaxle casing 20.

Gear mechanism 23 is a combination of a reduction gear train 48 and a differential gear unit 49. Reduction gear train 48 reduces a rotary speed of power outputted from electric motor 19. Differential gear unit 49 differentially transmits power outputted from reduction gear train 48 to right and left axles 24R and 24L.

Reduction gear train 48 includes an input shaft 43, a counter shaft 50, an input gear 51 provided on input shaft 43, and counter gears 52 and 53 provided on counter shaft 50. Further, a later-discussed ring gear 54 serving as an input gear of differential gear unit 49 also serves as a final gear of reduction gear train 48. Left and right bearings 46 are provided in respective left and right sidewalls 40 and 41 of left and right gear housing portions 36 and 37. Input shaft 43 is journalled by left and right sidewalls 40 and 41 via respective left and right bearings 46. Input gear 51 is fixed or formed on input shaft 43 in gear chamber 45 between left and right sidewalls 40 and 41. Input gear 51 is disposed along one (in this embodiment, left) bearing 46, while a later-discussed brake rotor 63 is also fixed on input shaft 43 in gear chamber 45 so as to be disposed along the other (in this embodiment, right) bearing 46.

One (in this embodiment, right) end of input shaft 43 projects from bearing 46 in sidewall 41 of one (in this embodiment, right) casing half 22 so as to be disposed coaxially to motor shaft 30, and is connected to the proximal end of motor shaft 30 via a shaft joint sleeve 42 so as to be rotatably integral with motor shaft 30. In this regard, the one end of input shaft 43 and the proximal end of motor shaft 30 are spline-fitted into shaft joint sleeve 42, for example. On the other hand, the other (in this embodiment, left) end of input shaft 43 is passed through sidewall 40 of the other (in this embodiment, left) casing half 21 so as to be disposed in parking brake unit 18 externally mounted on transaxle casing 20.

Counter shaft 50 is disposed between input shaft 43 and axles 24L and 24R in the fore-and-aft direction of transaxle 2, is extended laterally horizontally in parallel to input shaft 43 and axles 24L and 24R, and is journalled at left and right ends thereof by left and right sidewalls 40 and 41 via respective bearings. In gear chamber 45, large diameter counter gear 52 is formed or fixed on one of left and right portions (in this embodiment, fixed on a left portion) of counter shaft 50, and small diameter counter gear 53 is formed or fixed on the other of left and right portions (in this embodiment, formed on a right portion) of counter shaft 50. Large diameter counter gear 52 meshes with diametrically small input gear 51 on input shaft 43, and small diameter counter gear 53 meshes with diametrically large ring gear 54. Therefore, gears 51, 52, 53 and 54 constitute reduction gear train 48.

Figure 3:
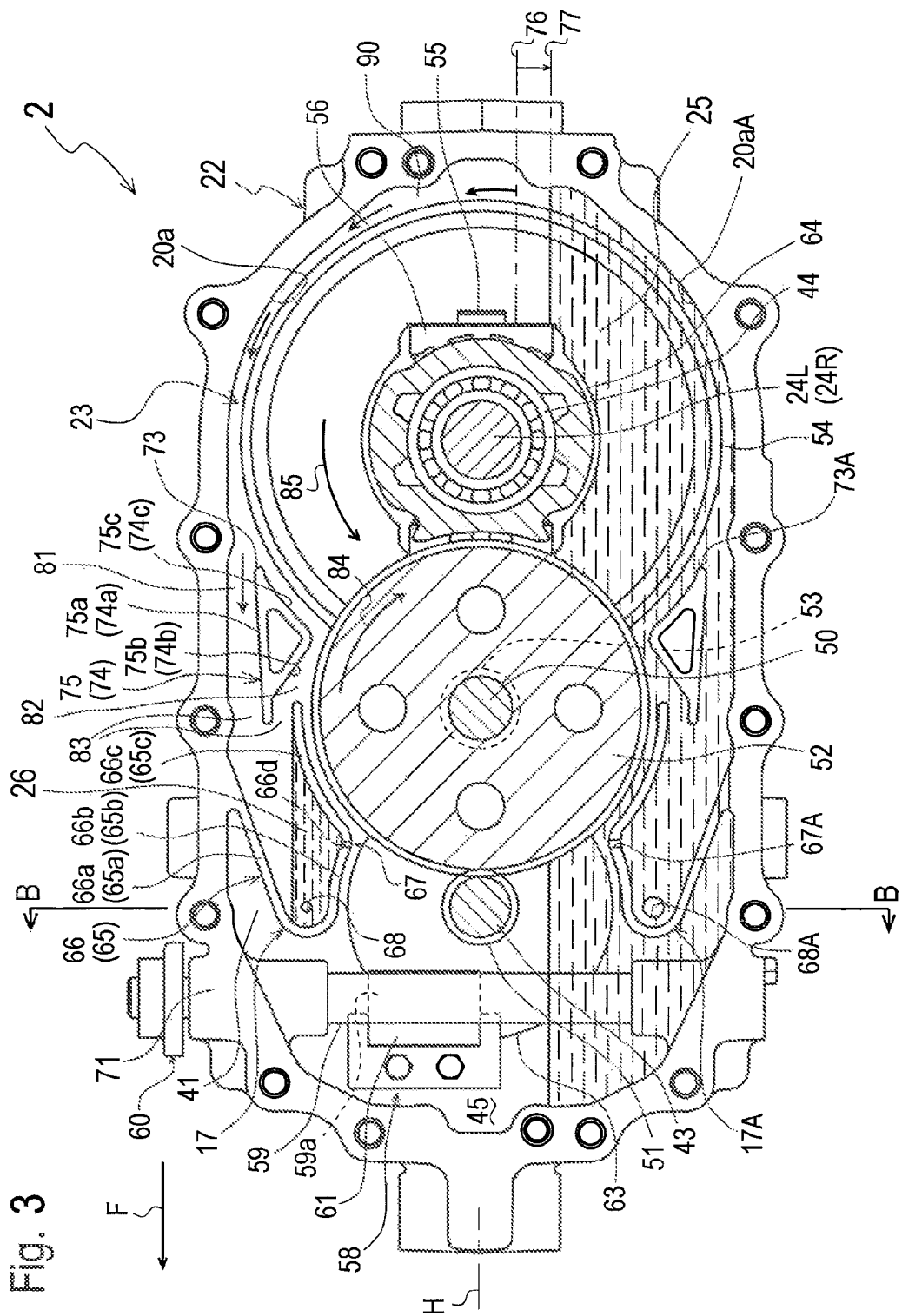
FIG. 3 is a cross sectional view of electric transaxle 2 taken along A-A arrowed line in FIG. 2, showing a structure for guiding lubricating fluid from a first fluid sump 25 to a second fluid sump 26 when gears of a gear mechanism 23 rotate in a direction for forward traveling of vehicle 1.
Figure 4:
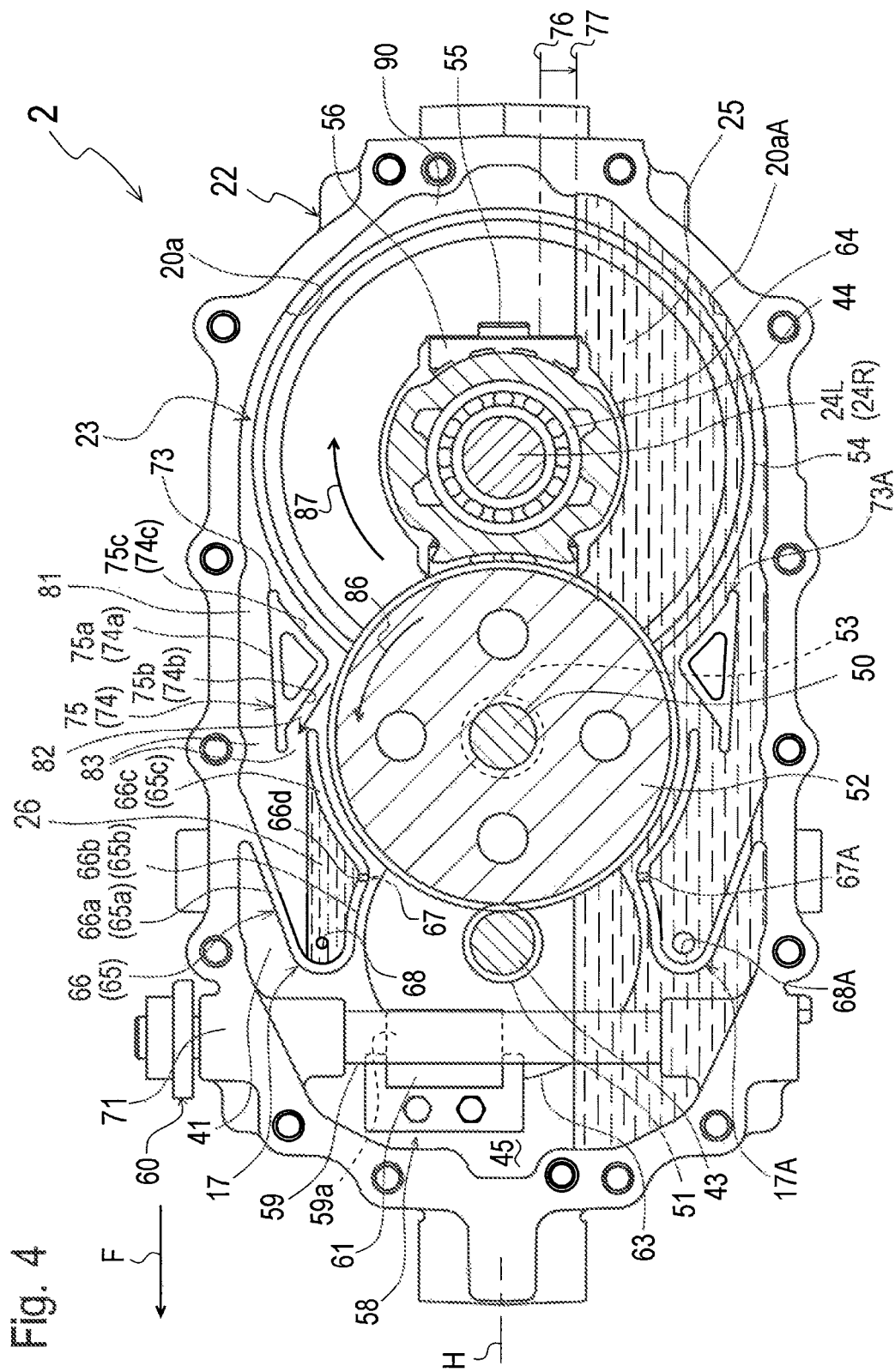
FIG. 4 is a cross sectional view of electric transaxle 2 taken along A-A arrowed line in FIG. 2, showing the structure for guiding lubricating fluid from first fluid sump 25 to second fluid sump 26 when the gears of gear mechanism 23 rotate in a direction for backward traveling of vehicle 1.

Differential gear unit 49 includes ring gear 54, a differential casing 64, a differential pinion shaft 55, a pair of differential bevel pinions 56, and a pair of right and left differential bevel side gears 57. Referring to FIGS. 3 and 4, differential casing 64 is disposed in gear chamber 45 between left and right axle supporting portions 38 and 39 of transaxle casing 20 so as to accommodate proximal ends of left and right axles 24L and 24R and so as to have a rotary axis that is coaxial to axles 24L and 24R. Ring gear 54 is fixed on an outer peripheral surface of differential casing 64 so as to serve as the input gear of differential gear unit 49, and meshes with small diameter counter gear 53 so as to also serve as the final gear of reduction gear train 48.

Differential pinion shaft 55 is supported in differential casing 64, having an axis that is perpendicular to axles 24R and 24L, so as to be rotatably integral with differential casing 64. The proximal ends of right and left axles 24R and 24L are fitted into an axial center portion of differential pinion shaft 55 so as to be rotatable relative to differential pinion shaft 55. Further, in differential casing 64, differential bevel pinions 56 are fitted on differential pinion shaft 55 so as to be symmetric with respect to the axial center portion of pinion shaft 55, and so as to be rotatable relative to differential pinion shaft 55. Further, in differential casing 64, right and left differential bevel side gears 57 are fixed on respective right and left axles 24R and 24L so as to be symmetric with respect to the axial center portion of differential pinion shaft 55. Each differential bevel pinion 56 meshes with both right and left differential bevel side gears 57. Therefore, differential gear unit 49 has the above-mentioned structure such as to differentially connect right and left axles 24R and 24L to each other.

Due to the above-mentioned structure of transaxle 2, power outputted from electric motor 19 is transmitted from motor shaft 30 to input shaft 43, and is transmitted to right and left axles 24R and 24L via reduction gear train 48 and differential gear unit 49.

In gear chamber 45, a vertical brake shaft 59 is supported by gear housing portion 37 of casing half 22 of transaxle casing 20 forward from input gear 51 so as to be rotatably centered on its own vertical axis. An end of brake shaft 59 projects from gear housing portion 37 of casing half 22 to the outside of transaxle casing 20 so as to be fixedly provided thereon with a brake arm 60. Brake arm 60 is operatively connected to a brake manipulator (not shown), such as a brake pedal, disposed adjacent to a driver's seat (not shown) of vehicle 1.

A vertical intermediate portion of brake shaft 59 is formed as a cam portion, which is semicircular sectionally in plan and has a vertical flat cam surface 59a. A brake shoe 61 is disposed between cam surface 59a and a front portion of brake rotor 63 fixed on input shaft 43. A brake pad 62 is disposed between the front portion of brake rotor 63 and sidewall 41 of gear housing portion 37 of casing half 22. In this way, brake shaft 59, brake rotor 63, brake shoe 61 and brake pad 62 constitute a brake mechanism 58 in gear chamber 45.

Due to the above-mentioned brake mechanism 58, when brake arm 60 is disposed at an unbraking position, cam surface 59a is disposed parallel to a vertical surface of brake shoe 61 so as to separate brake shoe 61 and brake pad 62 from brake rotor 63. When brake aim 60 is rotated to a braking position, cam surface 59a is slanted with respect to the vertical surface of brake shoe 61 so that an edge of cam surface 59a presses brake shoe 61 against brake rotor 63 so as to brake input shaft 43, thereby braking right and left axles 24R and 24L.

Figure 5:
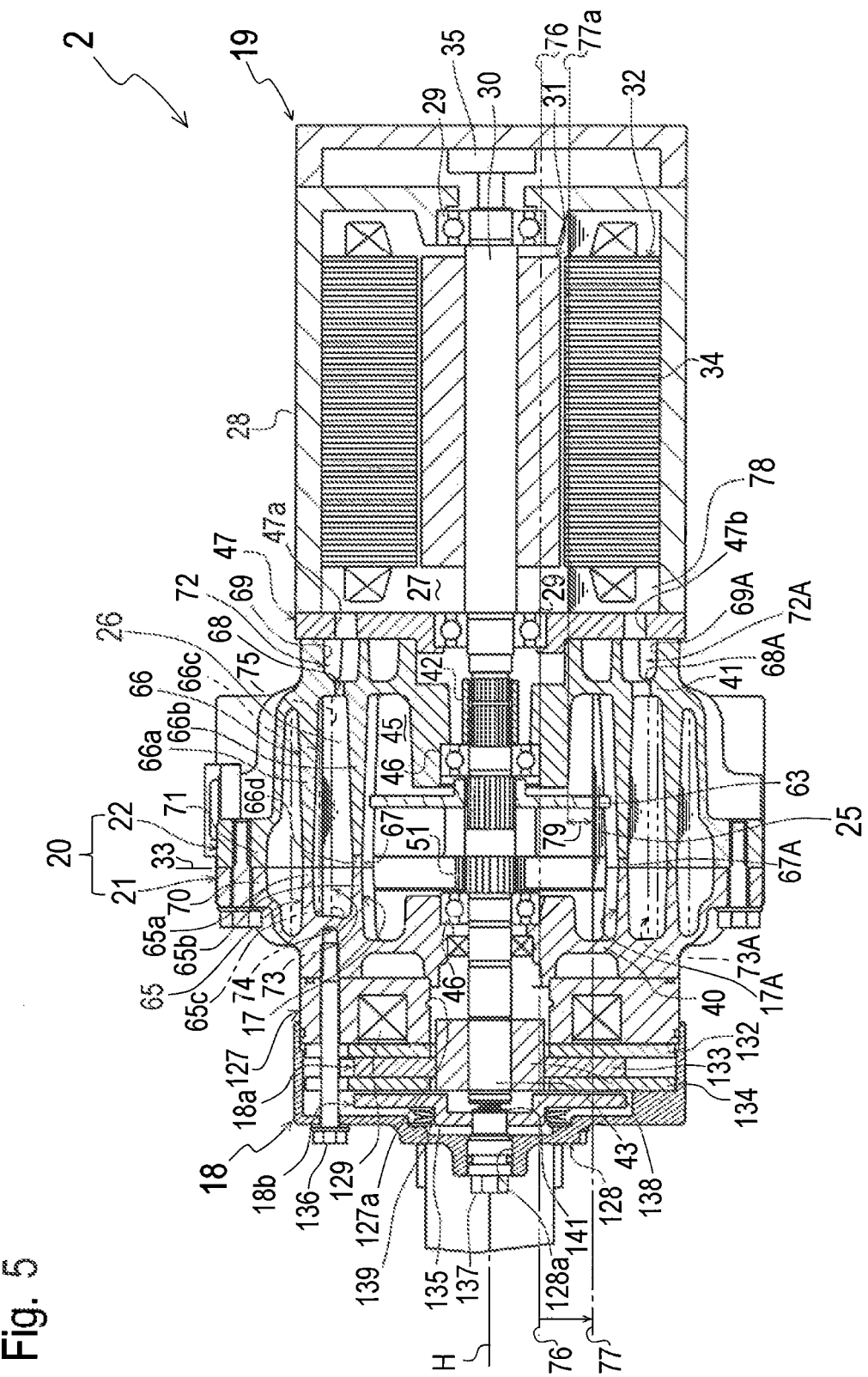
FIG. 5 is a cross sectional view of electric transaxle 2 taken along B-B arrowed line in FIG. 3.

Parking brake 18 will now be described with reference to FIGS. 2 and 5. Parking brake unit 18 includes a cylindrical support block 127, a brake acting mechanism 18a, a brake releasing mechanism 18b, and a brake cover 128. On the assumption that parking brake unit 18 is extended leftward from transaxle casing 20, support block 127 is attached to the left outer side surface of sidewall 40 of left casing half 21. Support block 127 has an axial hole 127a through which input shaft 43 extended leftwardly outward from sidewall 40 is passed so as to be rotatable freely from support block 127. Brake acting mechanism 18a and brake releasing mechanism 18b are provided in support block 127 and leftward from support block 127. Brake cover 128 is fitted to support block 127 so as to enclose brake acting mechanism 18a and brake releasing mechanism 18b, and is fastened to sidewall 40 of casing half 21 together with support block 127 by a bolt or bolts 136, as shown in FIG. 5.

Brake acting mechanism 18a includes armature windings 129, a spring 130, a boss 138, right and left vertical brake discs 132 and 134 and a vertical brake rotor 133. Boss 138 is fixed on the portion of input shaft 43 projecting leftward from support block 127. Slidable bake disc 132 and fixed brake disc 134 are fitted on boss 138 so as to be rotatable relative to boss 138 and input shaft 43. As shown in FIG. 2, fixed brake disc 134 is fastened to support block 127 by a bolt 141, so that fixed brake disc 134 is not rotatable relative to support block 127, and is not slidable along boss 138 in the axial direction of input shaft 43. Further, as shown in FIG. 2, a collar 141a is fitted on bolt 141 between fixed brake disc 134 and support block 127, and slidable brake disc 132 is slidably fitted to collar 141a, thereby being allowed to slide along boss 138 in the axial direction of input shaft 43. Vertical discoid brake rotor 133 is fixed on boss 138 between brake discs 132 and 134. Incidentally, as shown in FIG. 5, bolt 136 for fastening brake cover 128 to support block 127 is passed through brake discs 132 and 134 so as to allow the slide of slidable brake disc 132 in the axial direction of input shaft 43.

Spring 130 is fitted in support block 127 so as to bias slidable brake disc 132 toward fixed brake disc 134, thereby clamping brake rotor 133 between brake discs 132 and 134. Armature windings 129 are fitted in support block 127 so as to face slidable brake disc 132. Therefore, when armature windings 129 are excited, armature windings 129 attract slidable brake disc 132 away from bake rotor 133 against the biasing force of spring 130 so as to allow brake rotor 133 to rotate together with input shaft 43 freely from brake discs 132 and 134. When armature windings 129 are unexcited, slidable brake disc 132 is released from the attraction force of armature windings 129 and is clamped between brake discs 132 and 134 by the biasing force of spring 130, thereby braking input shaft 43. This means that when transaxle 2 is stationary with no electric power supply to electric motor 19, input shaft 43 is naturally braked so as to brake motor shaft 30 and axles 24L and 24R because armature windings 129 are not excited. Therefore, brake acting mechanism 18a functions as a parking brake of vehicle 1 equipped with transaxle 2.

Brake releasing mechanism 18b is provided to manually release the parking brake that is naturally applied by brake acting mechanism 18a when vehicle 1 equipped with transaxle 2 is parked. Brake releasing mechanism 18b includes a thrust pin 131 for pushing slidable brake disc 132, a pressure member 135 for pushing thrust pin 131, a spring 139 for biasing pressure member 135, and a screw 137 for manually operating pressure member 135. Pressure member 135 is disposed between brake cover 128 and fixed brake disc 134. Brake cover 128 has a threaded hole 128a, and screw 137 is screwed through threaded hole 128a, is disposed coaxially to input shaft 43, and is fixed to pressure member 135 in brake cover 128. Spring 139, such as a leaf spring, is interposed between brake cover 128 and pressure member 135 so as to bias pressure member 135 toward fixed brake disc 134. Thrust pin 131 is interposed between pressure member 135 and slidable brake disc 132, and is passed through fixed brake disc 134 so as to be allowed to move in the axial direction of input shaft 43.

Therefore, to release the parking brake as the function of brake acting mechanism 18a, screw 137 is manually screwed inward toward input shaft 43 so as to move pressure member 135 toward fixed brake disc 134, thereby pushing slidable brake disc 132 toward support block 127 and away from brake rotor 133 via thrust pin 131 against the biasing force of spring 130, thereby separating brake rotor 133 from slidable brake disc 132. As a result, axle 24L and 24R become rotatable freely from the parking brake, so that the parked vehicle can be towed, for example.

Figure 8:
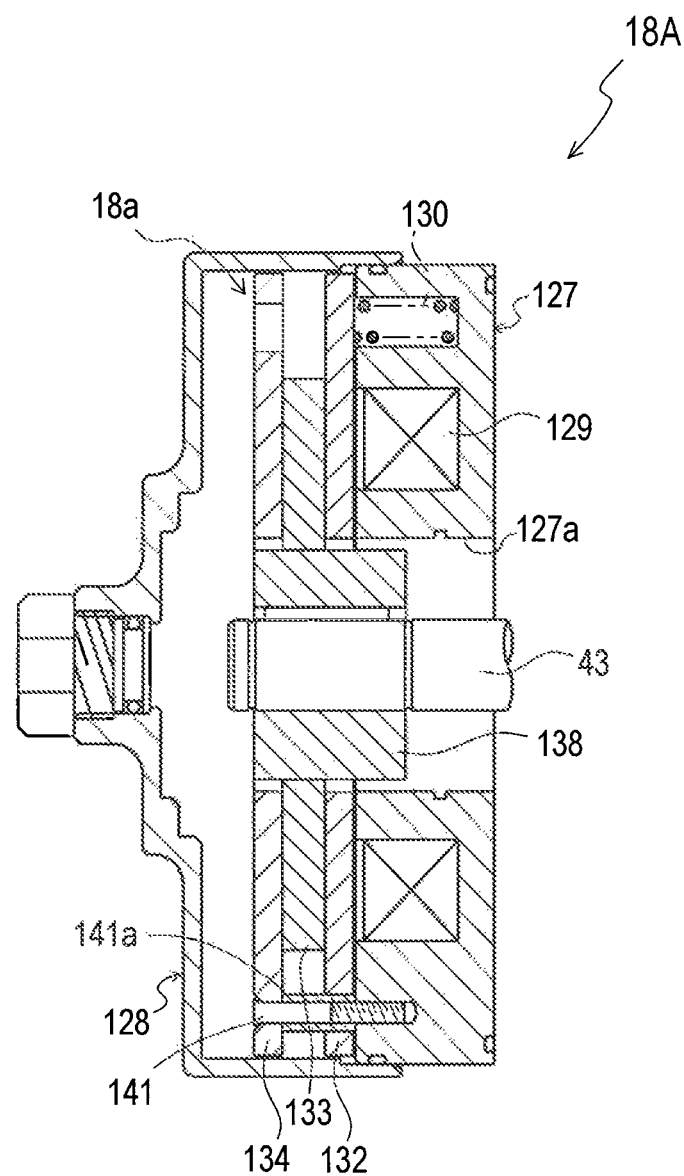
FIG. 8 is a sectional plan view of an alternative parking brake unit 18A.
Figure 9:
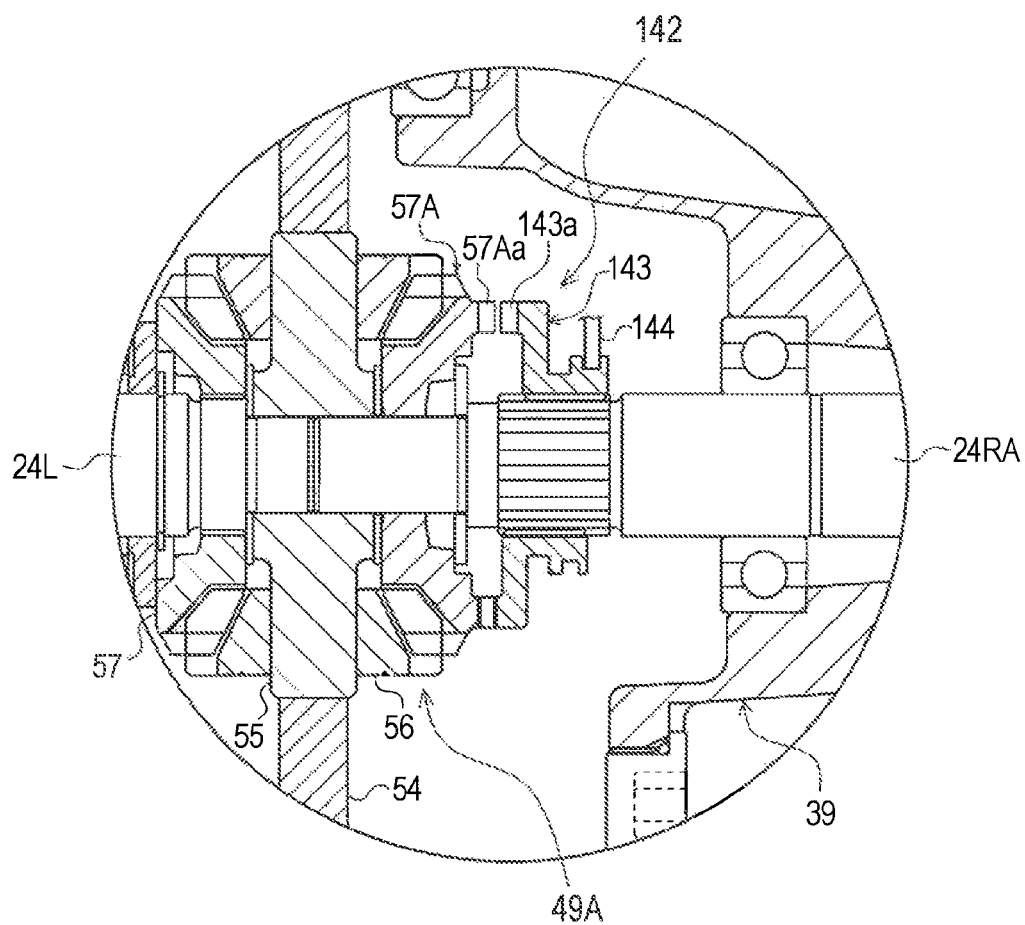
FIG. 9 is a fragmentary sectional plan view of electric transaxle 2 showing an alternative differential gear unit 49A provided with a clutch 142, which is adapted when electric transaxle 2 is provided with parking brake unit 18A.

In transaxle 2, parking brake unit 18 and differential gear unit 49 may be replaced with an alternative parking brake unit 18A shown in FIG. 8 and an alternative differential gear unit 49A that is provided with a clutch 142 as shown in FIG. 9. Referring to FIG. 8, parking brake unit 18A corresponds to parking brake unit 18 excluding that pressure member 135, spring 139 and pushpin 131 are omitted. In other words, parking brake unit 18A has only the function of brake acting mechanism 18a, in comparison with parking brake unit 18, which has both the functions of brake acting mechanism 18a and brake-releasing mechanism 18b.

Referring to FIG. 9, differential gear unit 49A is provided in gear chamber 45 so as to transmit power from reduction gear train 48 to left axle 24L and an alternative right axle 24RA. Left axle 24L and right axle 24RA are fitted at respective proximal ends thereof into differential pinion shaft 55 so as to be rotatable relative to differential pinion shaft 55. While left differential side gear 57 is fixed on left axle 24L, an alternative right differential side gear 57A is fitted on right axle 24RA so as to be rotatable relative to right axle 24RA. A clutch slider 143 is spline-fitted on right axle 24RA so as to be unrotatable relative to right axle 24RA and so as to be slidable along right axle 24RA in the axial direction of right axle 24RA. A fork 144 is fitted on clutch slider 143, and a manually operable clutch operation device is provided on transaxle casing 20 and is operatively connected to fork 144 for operating the slide of clutch slider 143.

Differential side gear 57A is formed with clutch teeth 57Aa, and clutch slider 143 is formed with clutch teeth 143a facing clutch teeth 57Aa, so that differential side gear 57A and clutch slider 143 serve as a clutch 142 for selectively engaging or disengaging right axle 24RA with and from differential side gear 57A. In this regard, clutch teeth 143a can mesh with clutch teeth 57Aa of differential side gear 57A depending on the slide of clutch slider 143 on right axle 24RA. For only convenience to understanding, in FIG. 9, a portion of clutch slider 143 appearing above right axle 24RA is illustrated as being disposed at a clutch-off position where clutch teeth 143a are separated from clutch teeth 57Aa, and a portion of clutch slider 143 appearing below right axle 24RA is illustrated as being disposed at a clutch-off position where clutch teeth 143a mesh with clutch teeth 57Aa.

Normally, clutch slider 143 is disposed at the clutch-on position so as to fix differential side gear 57A to right axle 24RA. Therefore, left and right axles 24L and 24RA are driven by rotation of ring gear 54 that is driven by electric motor 19 via reduction gear train 48, and are allowed to rotate differentially.

When electric motor 19 is not supplied with electric power to park vehicle 1, brake acting mechanism 18a of parking brake unit 18A naturally functions as the parking brake that applies the braking force to gear mechanism 23 including differential gear unit 49A. In this state, when parked vehicle 1 is going to be towed, clutch slider 143 is disposed at the clutch-off position so as to separate right axle 24RA from differential side gear 57A, thereby releasing left and right axles 24L and 24RA from the braking force of brake acting mechanism 18a onto differential gear unit 49A.

Accordingly, during the towing of vehicle 1, right axle 24RA that is rotatable freely from differential pinion shaft 55 and differential side gear 57A is rotated so as to follow rotation of right drive wheel 12 of vehicle 1 connected to right axle 24RA. Left differential side gear 57 rotates so as to follow left axle 24L rotating together with left drive wheel 12 of vehicle 1 connected to left axle 24L, however, the rotation of left differential side gear 57 merely rotates differential pinions 56 relative to differential pinion shaft 55, and the rotation of differential pinions 56 rotates differential side gear 57A freely from right axle 24RA, thereby keeping stationary ring gear 54. Therefore, during the towing of vehicle 1, left and right drive wheels 12 of vehicle 1 can be rotated freely from the parking brake function of brake acting mechanism 18a of parking brake unit 18A.

Alternatively, differential gear unit 49A may be configured to have a clutch for engaging or disengaging the left axle with and from the left differential side gear.

A lubrication structure of transaxle 2 will be described with reference to FIGS. 2 to 5. First fluid sump 25 is provided in the lower portion of gear chamber 45 as mentioned above, and a second fluid sump 26 is provided in an upper front portion of gear chamber 45. In this regard, a reservoir 17 is formed to extend forwardly downward from upper portion 20a of transaxle casing 20, and fluid stored in reservoir 17 serves as second fluid sump 26.

Reservoir 17 has a rear opening 83, and transaxle casing 20 is formed with a guide 73 in gear chamber 45 immediately rearward from rear opening 83 of reservoir 17. In this regard, lubrication fluid of first fluid sump 25 is raised and splashed by rotating the gears of gear mechanism 23, e.g., gears 52 and 54, and guide 73 leads the splashed fluid into second fluid sump 26.

A structure of reservoir 17 will be detailed. Right casing half 22 is formed with a right reservoir half 66, which projects from sidewall 41 toward joint plane 33 so as to be defined as a right half of reservoir 17. Left casing half 21 is formed with a left reservoir half 65, which projects from sidewall 40 toward joint plane 33 so as to be defined as a left half of reservoir 17. When left and right casing halves 21 and 22 are joined to each other, left and right reservoir halves 65 and 66 abut against each other so as to be joined to each other, thereby being formed as reservoir 17.

As shown in FIGS. 3 and 4, right reservoir half 66 is formed with an upper wall 66a, a front lower wall 66b, and a rear lower wall 66c. Upper wall 66a is extended forwardly and downwardly slantwise from the horizontal upper portion of flange 71 of right casing half 22. Front lower wall 66b is extended rearwardly downward from an arcuate front bottom end portion of upper wall 66a so as to be curved along a rearward upper portion of an outer periphery of brake rotor 63 disposed immediately therebelow. Rear lower wall 66c is extended rearwardly upward from a rear bottom end of front lower wall 66b so as to be curved along a forward upper portion of an outer periphery of large diameter counter gear 52 disposed immediately therebelow.

Similarly, left reservoir half 65 (not shown in FIGS. 3 and 4) is formed with an upper wall 65a, a front lower wall 65b, and a rear lower wall 65c, so as to coincide to upper wall 66a, front lower wall 66b and rear lower wall 66c of right reservoir half 66, respectively. Upper wall 65a is extended forwardly and downwardly slantwise from the horizontal upper portion of flange 70 of left casing half 21. Front lower wall 65b is extended rearwardly downward from an arcuate front bottom end portion of upper wall 65a so as to be curved along the rearward upper portion of brake rotor 63 disposed immediately therebelow. Rear lower wall 65c is extended rearwardly upward from a rear bottom end of front lower wall 65b so as to be curved along the forward upper portion of large diameter counter gear 52 disposed immediately therebelow.

By joining left and right reservoir halves 65 and 66 to each other to form reservoir 17, upper rear ends of mutually joined upper walls 65a and 66a define a top end of rear opening 83 of reservoir 17, and upper rear ends of mutually joined rear lower walls 65c and 66c define a bottom end of rear opening 83 of reservoir 17. Mutually joined rear lower walls 65c and 66c, mutually joined front lower walls 65b and 66b, and the front bottom portions of mutually joined upper walls 65a and 66a define a recess that is recessed downward from a level defining a height of the upper rear ends of rear lower walls 65c and 66c serving as the bottom end of rear opening 83 of reservoir 17. The fluid introduced into reservoir 17 via rear opening 83 is stored in this recess so as to serve as second fluid sump 26.

A junction, where the rear bottom ends of front lower walls 65b and 66b are joined to the front bottom ends of rear lower walls 65c and 66c, defines a deepest portion of the recess of reservoir 17 serving as second fluid sump 26, and is formed with a vertical orifice 67 fluidly connecting second fluid sump 26 in reservoir 17 to a space in gear chamber 45 below reservoir 17. Therefore, fluid of second fluid sump 26 falls to first fluid sump 25 via orifice 67.

In the illustrated embodiment, only a portion of right reservoir half 66 corresponding to the deepest portion of reservoir 17 is formed with a vertical groove 66d defining orifice 67 while left reservoir half 65 is formed with no groove for forming orifice 67. When left and right reservoir halves 65 and 66 are joined to each other, a vertical flat surface of left reservoir half 65 with no groove defines a left wall surface of orifice 67. Alternatively, both left and right reservoir halves 65 and 66 may be formed with respective grooves, and these grooves may coincide to each other to form orifice 67 when left and right reservoir halves 65 and 66 are joined to each other. Alternatively, only left reservoir half 65 may be formed with a groove defined as orifice 76, and the corresponding portion of right reservoir half 66 may be formed as a flat surface with no groove.

Therefore, orifice 67 is easily formed in reservoir 17 by only joining left and right reservoir halves 65 and 66 to each other according to joining left and right casing halves 21 and 22 to form transaxle casing 20.

A structure of guide 73 will be detailed. Referring to FIGS. 3 and 4, right casing half 22 is formed with a right guide half 75, which projects from sidewall 41 toward joint plane 33 so as to be defined as a right half of guide 73. Left casing half 21 (not shown in FIGS. 3 and 4) is formed with a left guide half 74, which projects from sidewall 40 toward joint plane 33 so as to be defined as a left half of guide 73. When left and right casing halves 21 and 22 are joined to each other, left and right guide halves 74 and 75 abut against each other so as to be joined to each other, thereby forming guide 73 in a triangular shape when viewed in side, i.e., when viewed in the axial direction of axles 24L and 24R.

Right guide half 75 is formed with an upper surface 75a, a front lower surface 75b, and a rear lower surface 75c. Upper surface 75a is extended rearward from rear opening 83 of reservoir 17 so as to be horizontal or slightly rearwardly upward slant, and is spaced downward from the horizontal upper portion of flange 71 of right casing half 22. Front lower surface 75b is extended rearwardly downwardly slantwise from a front end of upper surface 75a disposed at rear opening 83 of reservoir 17, so as to face a rearward upper portion of large diameter counter gear 52 disposed immediately therebelow. Rear lower surface 75c is extended rearwardly upwardly slantwise from a rear bottom end of front lower surface 75b to a rear end of upper surface 75a, as to face a forward upper portion of ring gear 54 disposed immediately therebelow.

Similarly, left guide half 74 (not shown in FIGS. 3 and 4) is formed with an upper surface 74a, a front lower surface 74b, and a rear lower surface 74c so as to coincide to upper surface 75a, front lower surface 75b and rear lower surface 75c of right guide half 75, respectively. Upper surface 74a is extended rearward from rear opening 83 of reservoir 17 so as to be horizontal or slightly rearwardly upward slant, and is spaced downward from the horizontal upper portion of flange portion 70 of left casing half 21. Front lower surface 74b is extended rearwardly downwardly slantwise from a front end of upper surface 74a disposed at rear opening 83 of reservoir 17, so as to face the rearward upper portion of large diameter counter gear 52 disposed immediately therebelow. Rear lower surface 74c is extended rearwardly upwardly slantwise from a rear bottom end of front lower surface 74b to a rear end of upper surface 74a, as to face the forward upper portion of ring gear 54 disposed immediately therebelow.

By joining casing halves 21 and 22 to each other to form transaxle casing 20, a space between the ceiling of gear chamber 45 defined by the horizontal upper portions of mutually joined flanges 70 and 71 and an upper surface of guide 73 defined by upper surfaces 74a and 75a of mutually joined guide halves 74 and 75 is defined as a first fluid introduction passage 81 for introducing fluid, raised and splashed from first fluid sump 25 by the gears of gear mechanism 23, into reservoir 17 when the gears rotate for forward traveling of vehicle 1, and a space between a rear end of reservoir 17 defined by the upper rear ends of mutually joined rear lower walls 65c and 66c and a slant front lower surface of guide 73 defined by mutually joined front lower surfaces 74b and 75b is defined as a second fluid introduction passage 82 for introducing fluid, raised and splashed from first fluid sump 25 by the gears of gear mechanism 23, into reservoir 17 when the gears rotate for backward traveling of vehicle 1.

More specifically, on the assumption that transaxle 2 is arranged in vehicle 1 as shown in FIG. 1, when vehicle 1 travels forward in the direction designated by arrow F, referring to FIG. 3, large diameter counter gear 52 rotates in a forward traveling direction 84 as arrowed in FIG. 3, and ring gear 54 rotates in a forward traveling direction 85 as arrowed in FIG. 3 so as to raise fluid of first fluid sump 25 at a rear lower portion thereof. The fluid raised upward from first fluid sump 25 by the rear lower portion of ring gear 54 moves further upward along with upward movement of the rear portion of ring gear 54 rotating in forward traveling direction 85 so as to pass a gap space 90 between the rear portion of ring gear 54 and a rear wall of gear chamber 45 defined by mutually joined flanges 70 and 71 at a rear portion of transaxle casing 20. After the fluid passing gap space 90 reaches a top end of gap space 90 defined by a top portion of ring gear 54, the fluid is splashed forward from gap space 90 by the top portion of rotating ring gear 54, enters first fluid introduction passage 81, flows forward along the upper surface of guide 73, which is horizontal or slightly forwardly downward slant, and finally flows into the downward recess of reservoir 17, serving as second fluid sump 26, via rear opening 83 of reservoir 17.

On the other hand, on the same assumption regarding arrangement of transaxle 2 in vehicle 1, when vehicle 1 travels backward opposite to the direction designated by arrow F, referring to FIG. 4, large diameter counter gear 52 rotates in a backward traveling direction 86 as arrowed in FIG. 4 opposite to forward traveling direction 84, and ring gear 54 rotates in a backward traveling direction 87 as arrowed in FIG. 4 opposite to forward traveling direction 85. Therefore, a rear lower portion of large diameter counter gear 52 and a front lower portion of ring gear 54 raise fluid of first fluid sump 25, and the fluid raised from first fluid sump 25 moves further upward along with upward movement of the rear portion of large diameter counter gear 52 rotating in backward traveling direction 86 and along with upward movement of the front portion of ring gear 54 rotating in backward traveling direction 87, and finally enters second fluid introduction passage 82 so as to flow into the recess of reservoir 17 serving as second fluid sump 26.

Due to the above-mentioned structure, during traveling of vehicle 1, lubricating fluid of first fluid sump 25 is stirred and raised by gears 52 and 54 of gear mechanism 23 in gear chamber 45, and is introduced to second fluid sump 26 via either first fluid introduction passage 81 or second fluid introduction passage 82, regardless of whether vehicle 1 travels forward or backward.

Referring to FIGS. 3 and 4, as mentioned above, transaxle casing 20 is formed so as to have upper portion 20a defining the ceiling of gear chamber 45 and so as to have lower portion 20aA defining the bottom of gear chamber 45. It is assumed that motor shaft 30, input shaft 43, counter shaft 50 and axles 24L and 24R have respective axes disposed on a phantom horizontal plane H. On this assumption, upper portion 20a and lower portion 20aA are formed symmetric with respect to plane H. Aforesaid reservoir 17, serving as second fluid sump 26, and aforesaid guide 73, defining first and second fluid introduction passages 81 and 82, are formed along upper portion 20a of transaxle casing 20. Further, a reservoir 17A and a guide 73A are formed along lower portion 20aA so as to be symmetric to reservoir 17 and guide 73 with respect to plane H. Reservoir 17A and guide 73A are submerged in first fluid sump 25. Reservoir 17A is formed with a vertical orifice 67A that is symmetric to vertical orifice 67 of reservoir 17 with respect to plane H.

On the assumption that electric motor 19 is provided on the right outer side surface of right sidewall 41 of transaxle casing 20 as shown in FIG. 5, right sidewall 41 is formed with a fluid gallery 69 opened outward at the right outer side surface thereof, and is formed therein with a horizontal orifice 68 between reservoir 17 and fluid gallery 69. One end of horizontal orifice 68 is opened at a vertical surface of right sidewall 41 defining reservoir 17 adjacent to the arcuate front bottom ends of upper walls 65a and 66a joined to front lower walls 65b and 66b, and horizontal orifice 68 is extended laterally of transaxle 2 so that the other end of horizontal orifice 68 is opened at another vertical surface of right sidewall 41 defining fluid gallery 69. End plate 47 is formed therethrough with a connection hole 47a, which is opened at one end thereof to fluid gallery 69, and which is opened at the other end thereof to motor chamber 27 in motor casing 28.

Therefore, horizontal orifice 68, fluid gallery 69 and connection hole 47a constitute a fluid supply passage 72 for supplying fluid of second fluid sump 26 to motor chamber 27 in motor casing 28. Only sidewall 41 of transaxle casing 20 and base end plate 47 of electric motor 19 are used to form fluid supply passage 72, thereby simplifying and minimizing fluid supply passage 72, and thereby reducing the number of components for forming fluid supply passage 72. The fluid supplied into motor chamber 27 via fluid supply passage 72 is used for cooling electric motor 19 and is accumulated in a lower portion of motor chamber 27 so as to serve as a third fluid sump 78.

On the assumption that electric motor 19 is disposed rightward from transaxle casing 20 as mentioned above, referring to FIGS. 3 to 5, base end plate 47 of electric motor 19 is formed therethrough with a connection hole 47b opened to third fluid sump 78 in motor chamber 27, and sidewall 41 of transaxle casing 20 is formed with a fluid gallery 69A connected to connection hole 47b, and is formed with a horizontal connection hole 68A fluidly connecting fluid gallery 69A to reservoir 17A. In this way, connection hole 47b, fluid gallery 69A and horizontal connection hole 68A constitute a fluid return passage 72A for returning fluid of third fluid sump 78 into reservoir 17A submerged in first fluid sump 25.

On the above-mentioned assumption of phantom horizontal plane H, fluid supply passage 72 is formed above plane H, and fluid return passage 72A is formed symmetric to fluid supply passage 72 with respect to plane H, excluding that a diameter of horizontal connection hole 68A corresponding to horizontal orifice 68 is larger than a diameter of horizontal orifice 68 so as to smoothly return fluid from third fluid sump 78 to reservoir 17A.

Due to the above-mentioned structure, when transaxle 2 is stationary, a level of first fluid sump 25 is disposed at an initial level 76 so that reduction gear train 48, differential gear unit 49 and brake mechanism 58 are submerged at substantially lower halves thereof in first fluid sump 25. Therefore, first fluid sump 25 has a sufficient amount of fluid for lubricating these component members in gear chamber 45 so as to be ready for driving transaxle 2.

During driving of transaxle 2, electric motor 19 is driven to rotate the gears of gear mechanism 23 so that the lubricating fluid of first fluid sump 25 is raised by rotating gear 54 and/or gear 52, and is introduced into second fluid sump 26 via the above-mentioned fluid introduction structure including guide 73 and first or second fluid introduction passage 81 or 82. The lubricating fluid of second fluid sump 26 flows into motor chamber 27 via fluid passage 72 so as to cool the component members of electric motor 19, such as stator 32. The fluid in motor chamber 27 is accumulated as third fluid sump 78, and is returned to first fluid sump 25 via fluid return passage 72A. Consequently, the level of first fluid sump 25 is lowered from initial level 76 to a level 77.

Here, as mentioned above, motor chamber 27 and gear chamber 45 are fluidly connected to each other via fluid return passage 72A. Therefore, when transaxle 2 is stationary, the level of fluid sump 78 is as high as level 76 of first fluid sump 25. When transaxle 2 is driven, the level of third fluid sump 78 is also lowered by rotating electric motor 19, however, third fluid sump 78 is supplied with fluid from second fluid sump 26 so as to keep a level 77a that is higher than lowered level 77 of first fluid sump 25. In other words, fluid stored in motor chamber 27 is increased by the quantity defined as a height difference 79 between levels 77 and 77a. Conversely, during driving of transaxle 2, third fluid sump 78 absorbs overflow of second fluid sump 26 so that the level of first fluid sump 25 can be lowered to level 77 that is low enough to sufficiently reduce the resistance of first fluid sump 25 to stirring of gear mechanism 23 and brake mechanism 58, thereby reducing power loss and increase of temperature of fluid. In this regard, level 77a is desirably set at a height close to the height of the bottom end of rotor 31 so as to be prevented from disturbing rotation of rotor 31.

Further, since guide 73 is disposed adjacent to rear opening 83 of reservoir 17, which is an entrance of second fluid sump 26, so as to define both first fluid introduction passage 81 for introducing fluid into reservoir 17 from first fluid sump 25 during forward traveling of vehicle 1 and second fluid introduction passage 82 for introducing fluid into reservoir 17 from first fluid sump 25 during backward traveling of vehicle 1, level 76 of first fluid sump 25 is surely lowered to level 77 so as to sufficiently reduce the resistance of first fluid sump 25 to stirring regardless of whether transaxle 2 is driven for forward traveling of vehicle 1 or for backward traveling of vehicle 1. This effect is especially advantageous for a vehicle, e.g., vehicle 1 as a lawn mower, which is liable to repeat switching of forward/backward traveling direction.

When driving transaxle 2 is stopped, driving electric motor 19 is stopped so as to stop rotation of gears 52 and 54, thereby stopping the fluid supply from first fluid sump 25 to second fluid sump 26. Further, fluid of second fluid sump 26 flows down to first fluid sump 25 via vertical orifice 67 and is returned to first fluid sump 25 via fluid passage 72, motor chamber 27 and fluid return passage 72A, whereby reservoir 17 serving as second fluid sump 26 becomes empty. As fluid is discharged from second fluid sump 26, the level of first fluid sump 25 rises from level 77 to level 76, and the level of third fluid sump 78 rises from level 77a to level 76.

Even if transaxle 2 is vertically reversed, due to the abovementioned upper and lower symmetry of transaxle casing 20, transaxle 2 ensures first and second fluid sumps 25 and 26, first and second fluid introduction passages 81 and 82, and the fluid supply and return passages from second fluid sump 26 to first fluid sump 25 via motor chamber 27.

More specifically, if transaxle 2 is vertically reversed front to rear, axles 24R and 24L are disposed forward from electric motor 19 and parking brake unit 18 while electric motor 19 is kept to extend rightward from transaxle casing 20 and parking brake unit 18 is kept to extend leftward from transaxle casing 20. If transaxle 2 is vertically reversed right to left, electric motor 19 is extended leftward from transaxle casing 20 and parking brake unit 18 is extended rightward from transaxle casing 20 while electric motor 19 and parking brake unit 18 are kept to be disposed forward from axles 24R and 24L.

In either of these cases, transaxle 2 is vertically reversed regardless of whether transaxle 2 is reversed front to rear or right to left. Accordingly, portion 20a of transaxle casing 20 comes to define the lower portion of gear chamber 45 in which first fluid sump 25 is provided. Portion 20aA of transaxle casing 20 comes to define the upper portion of gear chamber 45 above first fluid sump 25. Reservoir 17 and guide 73 are submerged in first fluid sump 25 in gear chamber 45. Reservoir 17A serves as second fluid sump 26, and guide 73A guides fluid from first fluid sump 25 to second fluid sump 26. Fluid passage 72A is disposed above plane H so as to serve as a fluid supply passage for supplying fluid from second fluid sump 26 in reservoir 17A to motor chamber 27. Fluid passage 72 is disposed below plane H so as to serve as a fluid return passage for returning fluid from third fluid sump 78 to reservoir 17 in first fluid sump 25.

Incidentally, in original transaxle 2 before being arranged in vehicle 1, each of holes 68 and 68A may have an original diameter defined as the diameter of the orifice in the fluid supply passage for supplying fluid from second fluid sump 26 to motor chamber 27, so that hole 68 or 68A of the fluid return passage for returning fluid from third fluid sump 78 to first fluid sump 25 after it is decided how to arrange transaxle 2 in vehicle 1 and whether fluid passage 72 or 72A serves as the fluid return passage.

In brief, on the assumption that horizontal plane H is defined as the plane of symmetry, transaxle casing 20 is formed with upper and lower portions, each of which defines first and second fluid sump 25 and 26, first and second fluid introduction passages 81 and 82 and the fluid passage connected to motor chamber 27, and the upper and lower portions are symmetric in shape and arrangement with respect to plane H. Therefore, vertically reversible transaxle 2 is adaptable to various designed vehicles, thereby progressing stabilization of transaxle 2 so as to reduce costs for providing component parts, such as die costs, and thereby resulting in reduction of manufacturing costs and inventory control costs.

Figure 6:
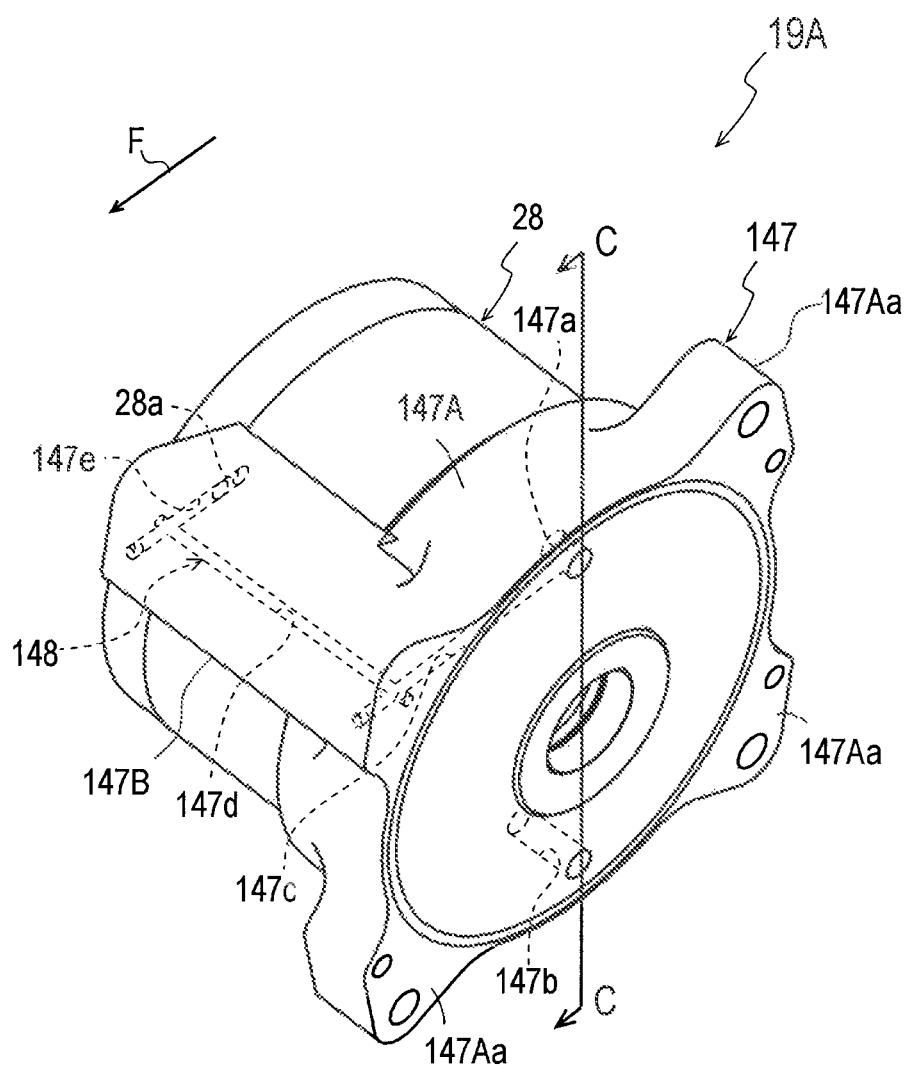
FIG. 6 is a perspective view of an alternative electric motor 19A.
Figure 7:
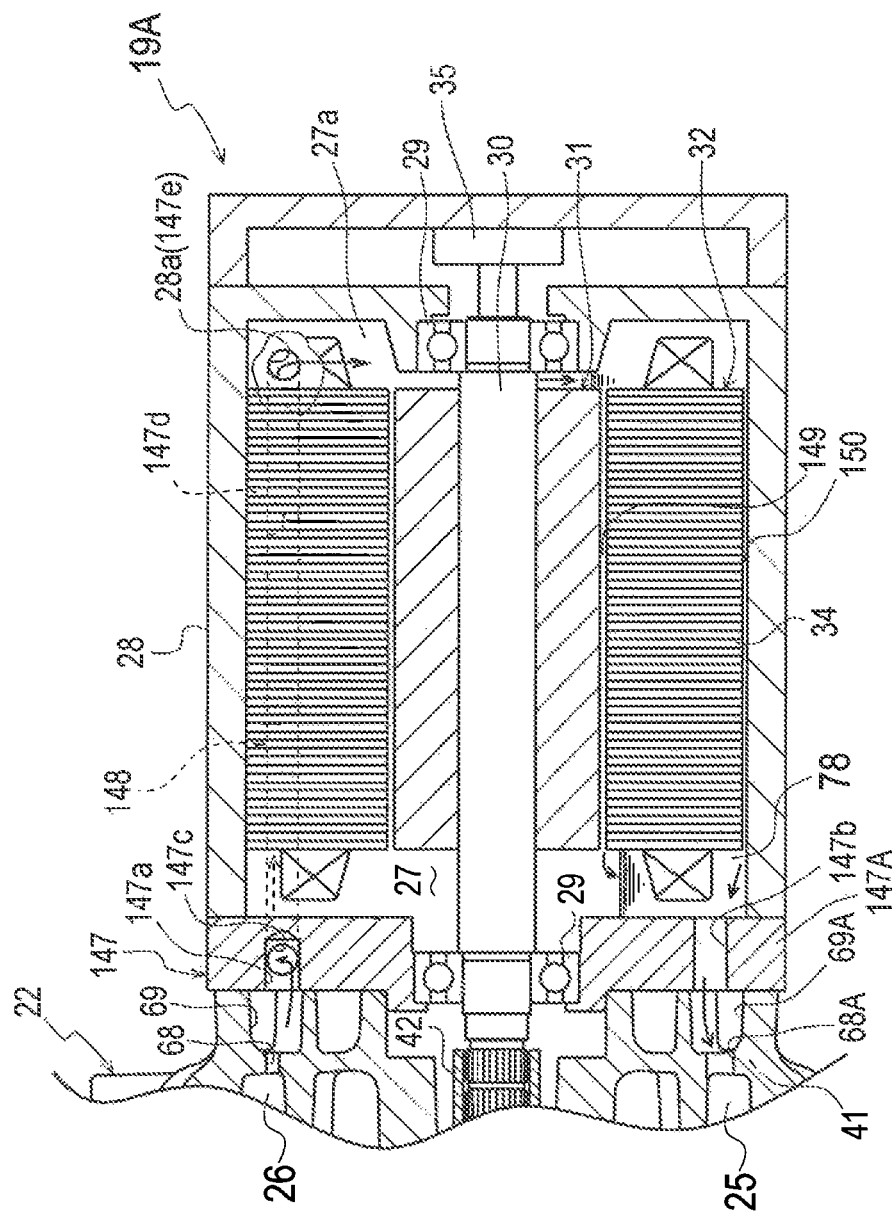
FIG. 7 is a cross sectional view of electric motor 19A taken along C-C arrowed line in FIG. 6 when attached to transaxle casing 20.

FIG. 6 shows an alternative electric motor 19A, and FIG. 7 shows an alternative structure for supplying fluid from second fluid sump 26 to motor chamber 27 and for returning fluid from third fluid sump 78 in motor chamber 27 to first fluid sump 25 when electric motor 19A is attached to transaxle casing 20. Electric motor 19A corresponds to electric motor 19 modified to improve the cooling effect of fluid supplied from second fluid sump 26.

Referring to FIGS. 6 and 7, electric motor 19A is provided with an alternative base end member 147. Base end member 147 includes a discoid portion 147A corresponding to base end plate 47 defining the proximal end portion of cylindrical motor casing 28 directly attached to the outer side surface of sidewall 41 of transaxle casing 20. Tabs 147Aa project radially from discoid portion 147A of base end member 147. Base end member 147 is formed with an extension portion 147B axially extending from one of tabs 147Aa along an outer peripheral surface of motor casing 28. The other tabs 147Aa have respective bolt holes to be fastened to the outer side surface of sidewall 41 of transaxle casing 20.

A pair of fluid holes 147a and 147b are formed in discoid portion 147A of base end member 147 so as to have respective axes parallel to the axis of motor shaft 30, and are arranged symmetrically with respect to the axis of motor shaft 30. When electric motor 19A is mounted onto transaxle casing 20, as shown in FIG. 7, fluid introduction hole 147a is disposed above motor shaft 30 and is connected to upper fluid gallery 69 so as to introduce fluid from second fluid sump 26 to motor chamber 27 in motor casing 28 via orifice 68 and fluid gallery 69, and fluid draining hole 147b is disposed below motor shaft 30 and is connected to lower fluid gallery 69A so as to return fluid from third fluid sump 78 in motor chamber 27 to first fluid sump 25 via fluid gallery 69A and connection hole 68A.

In extension portion 147B, an axial fluid hole 147d is formed so as to extend parallel to the axis of motor shaft 30, i.e., laterally of transaxle 2, and so as to have closed opposite ends. One end of axial fluid hole 147d disposed toward the proximal end of electric motor 19 defined by discoid portion 147A of base end member 147 is referred to a proximal end of axial fluid hole 147d, and the other axial end of axial fluid hole 147d disposed toward the distal end of electric motor 19 opposite to discoid portion 147A is referred to as a distal end of axial fluid hole 147d. A connection fluid hole 147c is formed in discoid portion 147A and extension portion 147B so as to extend horizontally in the fore-and-aft direction of transaxle 2, thereby fluidly connecting the proximal end of axial fluid hole 147d to fluid introduction hole 147a. A connection fluid hole 147e is formed in extension portion 147B so as to extend horizontally in the fore-and-aft direction of transaxle 2, thereby fluidly connecting the distal end of axial fluid hole 147d to motor chamber 27 via a connection fluid hole 28a formed through a peripheral wall of motor casing 28. In this way, fluid holes 147a, 147c, 147d and 147e in base end member 147 and fluid hole 28a in motor casing 28 constitute an extension fluid passage 148.

Motor chamber 27 includes a distal side space 27a between the distal end of motor casing 28 and distal ends of rotor 31 and stator 32 disposed in motor chamber 27. Fluid hole 28a is opened at an inner peripheral surface of motor casing 28 so as to face distal side space 27a of motor chamber 27, so that fluid from second fluid sump 26 flows into distal side space 27a via extension fluid passage 148. The fluid accumulated in distal side space 27a flows through a gap 149 between rotor 31 and stator 32 and through a gap 150 between stator 32 and the inner peripheral surface of motor casing 28, and reaches a proximal side space of motor chamber 27 between discoid portion 147A of base end member 147 and proximal ends of rotor 31 and stator 32. In this way, the fluid of third fluid sump 78 flows from the distal side to the proximal side in motor chamber 27 so as to effectively cool entire electric motor 19. The fluid in the proximal side space of motor chamber 27 is returned to first fluid sump 25 via fluid draining hole 147*b* in the lower portion of base end member 147.

Figure 10:
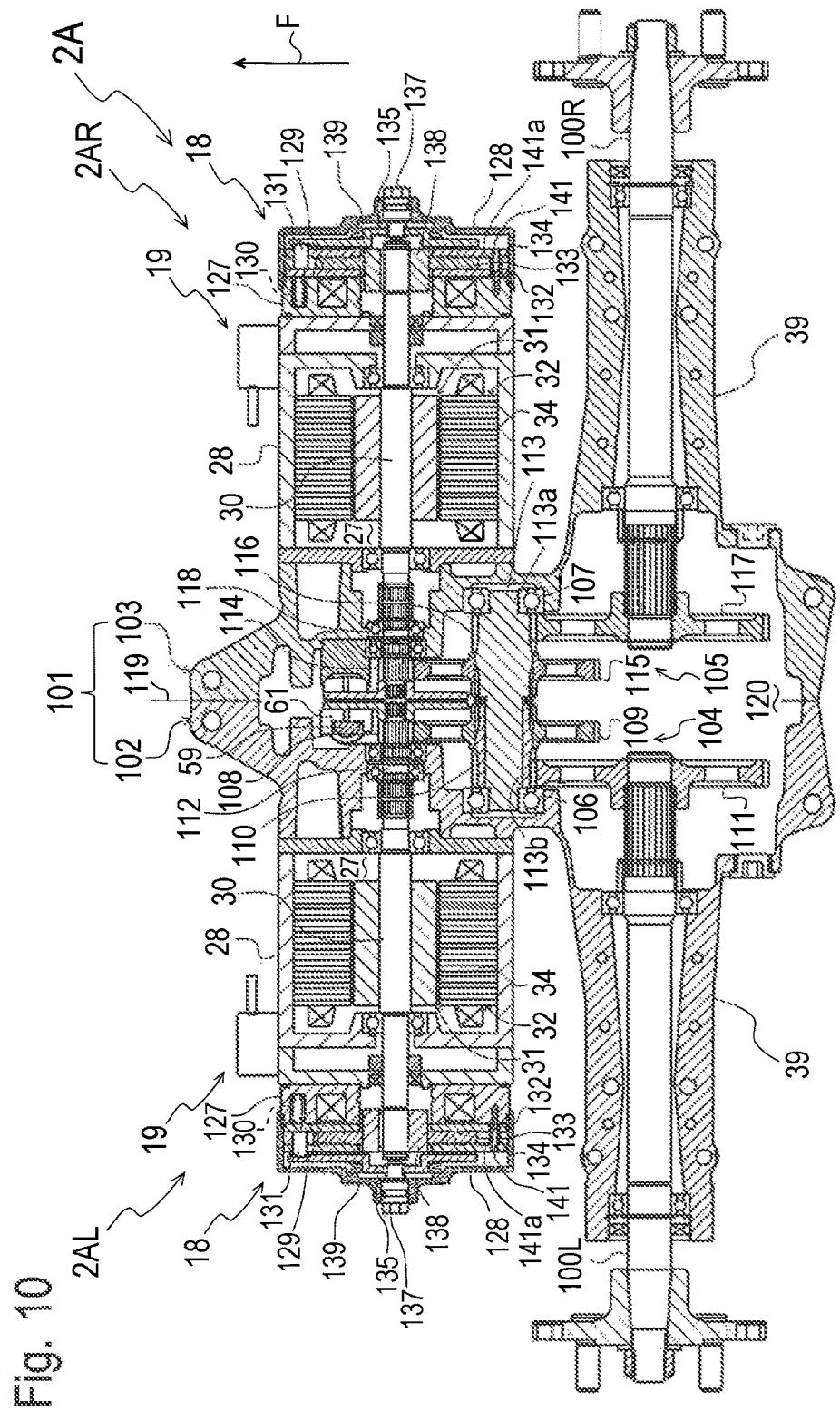
FIG. 10 is a sectional plan view of an alternative electric transaxle 2A constituted by joining left and right transaxle units 2AL and 2AR carrying respective left and right axles 100L and 100R.

Referring to FIG. 10, an alternative transaxle 2A has left and right electric motors 19 for respective left and right axles 100L and 100R, thereby being adaptable to a zero-turn vehicle. More specifically, a left transaxle unit 2AL carries left axle 100L and left electric motor 19 for driving left axle 100L, a right transaxle unit 2AR carries right axle 100R and right electric motor 19 for driving right axle 100R, and left and right transaxle units 2AL and 2AR are joined to constitute transaxle 2A. Hereinafter, transaxle 2A will be described in detail on the assumption that electric motors 19 are arranged forward from axles 100L and 100R as shown in FIG. 10. The same reference numerals as those used for description of transaxle 2 designate members or parts that are identical or equivalent to corresponding members and parts of transaxle 2.

Left transaxle unit 2AL includes a casing half 102. Left electric motor 19 is mounted onto a left side surface of a front portion of casing half 102 so as to extend leftward from casing half 102, and a left parking brake unit 18 for left axle 100L is provided on a distal end, i.e., a left end, of left electric motor 19. In this regard, motor shaft 30 of left electric motor 19 is extended distally, i.e., leftward, into left parking brake unit 18 so as to be provided with the above-mentioned components of brake acting mechanism 18*a* of left parking brake unit 18, e.g., boss 138, brake discs 132 and 132 and brake rotor 133. Left axle 100L is supported by a rear portion of casing half 102 so as to extend leftward from casing half 102. A left gear mechanism 104 is disposed in casing half 102 so as to transmit power from left electric motor 19 to left axle 100L.

Gear mechanism 104 includes an input shaft 112, an input gear 108 provided on input shaft 112, a counter shaft 113, counter gears 109 and 110 provided on counter shaft 113, and a final gear 111 provided on axle 100L. Input shaft 112 formed thereon with input gear 108 is extended coaxially and proximally, i.e., rightward, from motor shaft 30 of left electric motor 19, and is connected to motor shaft 30 rotatably integrally with motor shaft 30. Counter shaft 113 is journalled at a left end thereof by casing half 102 via a left bearing 106. Large diameter counter gear 109 and small diameter counter gear 110 are provided on a left portion of counter shaft 113. Input gear 108 meshes with large diameter counter gear 109, and small diameter counter gear 110 meshes with final gear 111 fixed on axle 100L, so that gears 108, 109, 110 and 111 serves as a left reduction gear train interposed between left input shaft 112 and left axle 100L.

Right transaxle 2AR includes a casing half 103. Right electric motor 19 is mounted onto a right side surface of a front portion of casing half 103 so as to extend rightward from casing half 103, and a right parking brake unit 18 for right axle 100R is fixed onto a distal end, i.e., a right end, of right electric motor 19. In this regard, motor shaft 30 of right electric motor 19 is extended distally, i.e., rightward, into right parking brake unit 18 so as to be provided with the above-mentioned components of brake acting mechanism 18*a* of right parking brake unit 18, e.g., boss 138, brake discs 132 and 132 and brake rotor 133. Right axle 100R is supported by a rear portion of casing half 103 so as to extend rightward from casing half 103. A right gear mechanism 105 is disposed in casing half 103 so as to transmit power from right electric motor 19 to right axle 100R.

Gear mechanism 105 includes an input shaft 118, an input gear 114 provided on input shaft 118, counter shaft 113, counter gears 115 and 116 provided on counter shaft 113, and a final gear 117 provided on axle 100R. Input shaft 118 formed thereon with input gear 114 is extended coaxially and proximally, i.e., leftward, from motor shaft 30 of right electric motor 19, and is connected to motor shaft 30 rotatably integrally with motor shaft 30. Counter shaft 113 is shared between left and right transaxle units 2AL and 2AR, and is journalled at a right end thereof by casing half 103 via a right bearing 107. Large diameter gear 115 and small diameter counter gear 116 are provided on a right portion of counter shaft 113. Input gear 114 meshes with large diameter counter gear 115, and small diameter counter gear 116 meshes with final gear 117 fixed on axle 100R, so that gears 114, 115, 116 and 117 constitute a right reduction gear train interposed between right input shaft 118 and right axle 100R.

Left and right casing halves 102 and 103 are joined to each other at a vertical joint plane 119 so as to form a transaxle casing 101 of transaxle 2A. Transaxle 101 defines a gear chamber 120 in which left gear mechanism 104 and right gear mechanism 105 are arranged symmetrically with respect to joint plane 119. More specifically, left and right input shafts 112 and 118 are extended coaxially to each other, left and right axles 100L and 100R are extended coaxially to each other, counter shaft 113 is shared between left and right gear mechanisms 104 and 105, and gears 108, 109, 110 and 111 of the left reduction gear train and gears 114, 115, 116 and 117 of the right reduction gear train are symmetric with respect to joint surface 119.

Fluid is accumulated in a lower portion of gear chamber 120 so as to serve as first fluid sump 25 for lubricating left and right gear mechanisms 104 and 105. Similar to transaxle casing 20, transaxle casing 101 is formed with upper and lower portions each of which can be arranged to define first and second fluid sumps 25 and second fluid sump 26, first and second fluid introduction passages 81 and 82, and the fluid supply and return passages between first and second fluid sumps 25 and 26 via motor chambers 27. These upper and lower portions of transaxle casing 101 are symmetric with respect to a non-illustrated phantom plane of symmetry, e.g., a horizontal plane on which axes of motor shafts 30, input shafts 112 and 118, counter shaft 113 and axles 100L and 100R are disposed. Especially, each of casing halves 102 and 103 is formed with the fluid supply and return passages via motor chamber 27 corresponding to above-mentioned fluid passages 72 and 72A defined by transaxle casing 20 and motor casing 28 in transaxle 2, so as to ensure that both left and right electric motors 19 are provided with respective third fluid sumps 78 supplied with fluid from second fluid sump 26 provided in an upper portion of gear chamber 120.

Due to the upper and lower symmetry of transaxle casing 101 (and motor casings 28), transaxle 2A ensures first and second fluid sumps 25 and 26 and first and second fluid introduction passages 81 and 82, and ensures the right and left fluid supply and return passages between first and second fluid sumps 25 and 26 via respective right and left motor chambers 27, regardless of whether transaxle 2A is arranged as illustrated in FIG. 8 or is vertically reversed front to rear or right to left.

Further, due to the left and right symmetry of transaxle 2A, i.e., due to the lateral symmetry of left and right transaxle units 2AL and 2AR, a common transaxle unit, serving as one of left and right transaxle units 2AL and 2AR, can be vertically reversed right to left so as to serve as the other of left and right transaxle units 2AL and 2AR. Therefore, two transaxle units that are identical to each other can serve as left and right transaxle units 2AL and 2AR to be joined to constitute transaxle 2A, thereby progressing standardization of the transaxle unit.

Left and right electric motors 19 are driven independently of each other, so that the power transmission from left electric motor 19 to left axle 100L via left gear mechanism 104 and the power transmission from right electric motor 19 to right axle 100R via right gear mechanism 105 are independent of each other. Therefore, the rotary speeds of respective electric motors 19 can be differentially controlled so as to differentially rotate left and right axles 100L and 100R, thereby enabling turning of a vehicle equipped with transaxle 2A. Further, each of left and right electric motors 19 is reversibly rotatable so that left and right axles 100L and 100R can be rotated in opposite directions, thereby enabling zero-turn of the vehicle.

In this regard, to ensure differential rotation of left and right gear mechanisms 104 and 105, counter shaft 113 shared between left and right transaxle units 2AL and 2AR is dividable into a main shaft member 113a and a sleeve 113b. Main shaft member 113a includes left and right portions whose diameters are different from each other. The diametrically larger left or right portion of main shaft member 113a has a diameter that is as large as a maximum diameter of sleeve 113b, and sleeve 113b is fitted on the diametrically smaller left or right portion of main shaft member 113a so as to be rotatable relative to main shaft member 113a. The set of counter gears 109 and 110 and the set of counter gears 115 and 116 are distributed between the diametrically larger left or right portion of main shaft member 113a and sleeve 113b.

In the present embodiment, the diametrically larger portion of main shaft member 113a serves as the above-mentioned right portion of counter shaft 113 on which right counter gears 115 and 116 are provided, and sleeve 113b fitted on the diametrically smaller left portion of main shaft member 113a serves as the above-mentioned left portion of counter shaft 113 on which left counter gears 109 and 110 are provided. More specifically, sleeve 113b is formed thereon with small diameter counter gear 110, and is fixedly provided thereon with large diameter counter gear 109 on the right side of small diameter counter gear 110. The diametrically larger right portion of main shaft member 113a is formed thereon with small diameter counter gear 116, and is fixedly provided thereon with large diameter counter gear 115 on the left side of small diameter counter gear 116.

Before casing halves 102 and 103 of respective left and right transaxle units 2AL and 2AR are joined to each other, left transaxle unit 2AL has left counter gears 109 and 110 provided on sleeve 113b and meshing with gears 108 and 111 in casing half 102, and right transaxle unit 2AR has right counter gears 115 and 116 provided on the diametrically larger right portion of main shaft member 113a and meshing with gears 114 and 117 in casing half 103, and supports the right end of main shaft member 113a by casing half 103 via right bearing 107. When casing halves 102 and 103 of transaxle units 2AL and 2AR are joined to each other at vertical joint plane 119, the diametrically smaller left portion of main shaft member 113a is inserted into sleeve 113b so as to completely form counter shaft 113, and is supported at the left end thereof by casing half 102 via left bearing 106.

Therefore, main shaft member 113a and sleeve 113b can be easily assembled together to constitute counter shaft 113 along with a process for joining casing halves 102 and 103 of left and right transaxle units 2AL and 2AR. In counter shaft 113, sleeve 113b is rotatable relative to main shaft member 113a so as to ensure that left counter gears 109 and 110 are rotatable relative to right counter gears 115 and 116, thereby enabling differential rotation of left and right gear mechanisms 104 and 105.

Transaxle 2A is provided with common brake mechanism 58 for simultaneously braking left and right axles 100L and 100R. In this regard, left brake rotor 63 is fixed on a right end of left input shaft 112, and right brake rotor 63 is fixed on a left end of right input shaft 118. Brake shaft 59 and brake shoe 61 are disposed on one of left and right sides (in this embodiment, a left side) of brake rotors 63, and brake pad 62 is disposed on the other of left and right sides (in this embodiment, a right side) of brake rotors 63, so that both brake rotors 63 on left and right input shafts 112 and 118 can be clamped between brake shoe 61 and brake pad 62 by operating brake shaft 59, thereby enabling both left and right axles 100L and 100R to be simultaneously braked by operating single brake shaft 59.

Referring to FIG. 9, an alternative transaxle 2B has a single axle 121 and electric motor 19 for driving axle 121. A vehicle can be equipped with two transaxles 2B for driving respective left and right axles 121, thereby enabling zero-turn. Hereinafter, representative transaxle 2B will be described on an assumption that axle 121 extends leftward from a rear portion of a transaxle casing 122, and electric motor 19 extends rightward from a front portion of transaxle casing 122. The same reference numerals as those used for description of transaxles 2 and 2A designate members or parts that are identical or equivalent to corresponding members and parts of transaxle 2 and 2A.

A left casing half 123 and a right casing half 124 are joined to each other at a vertical joint plane so as to constitute transaxle casing 122 defining a gear chamber 146 therein. Parking brake unit 18 is attached onto a left side surface of a front portion of left casing half 123, electric motor 19 is attached onto a right side surface of a front portion of right casing half 124, axle 121 is supported by joined left and right casing halves 123 and 124 via respective bearings and is extended leftwardly outward from left casing half 123.

A gear mechanism 125 is disposed in gear chamber 146 so as to transmit power from electric motor 19 to axle 121. Gear mechanism 125 includes input shaft 43, input gear 51 provided on input shaft 43, counter shaft 50, counter gears 52 and 53 provided on counter shaft 50, and a final gear 54A fixed on axle 121. Brake mechanism 58 is disposed around input shaft 43 in gear chamber 146, similar to brake mechanism 58 of transaxle 2. Large diameter counter gear 52 meshes with input gear 51, and small diameter counter gear 53 meshes with final gear 54A, so that gears 51, 52, 53 and 54A serves as a reduction gear train that is similar to reduction gear train 48 of above-mentioned gear mechanism 23. In gear mechanism 125, a differential gear mechanism such as differential gear unit 49 of gear mechanism 23 is omitted because differential driving of left and right axles 121 is achieved by pairing transaxle 2B.

Figure 11:
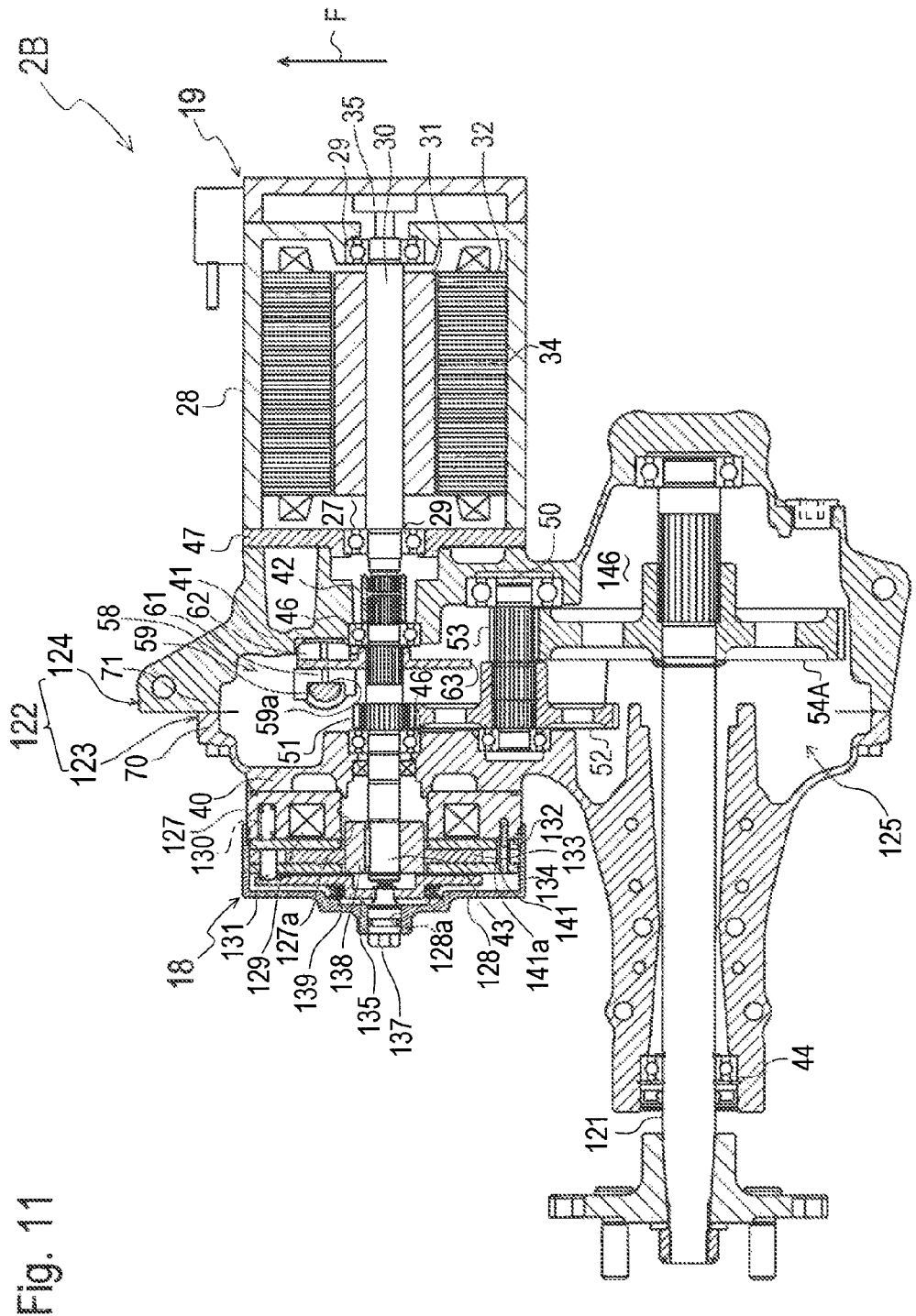
FIG. 11 is a sectional plan view of an alternative electric transaxle 2B carrying a single axle 121.
Figure 12:
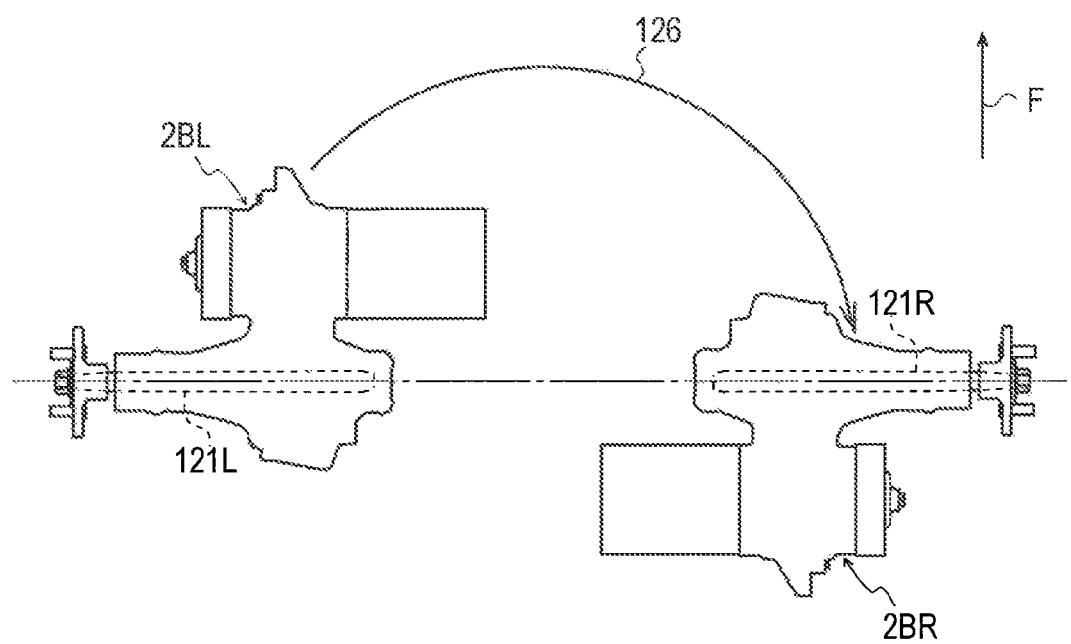
FIG. 12 is a schematic plan view of an arrangement of a pair of electric transaxles 2B.

FIG. 12 shows an arrangement of two transaxles 2B for providing differentially rotatable left and right axles 121 in a vehicle. One transaxle 2B is disposed to have axle 121 extending leftward from transaxle casing 122 as illustrated in FIG. 11, so as to serve as a left transaxle 2BL of the vehicle. The other transaxle 2B corresponds to left transaxle 2BL horizontally turned 180 degrees around, so as to serve as a right transaxle 2BR having axle 121 extended rightward from transaxle casing 122. Axle 121 of left transaxle 2BL and axle 121 of right transaxle 2BR are disposed coaxially to each other so as to serve as left and right axles 121 of the vehicle.

Further, transaxle casing 122 of transaxle 2B is formed with upper and lower portions each of which can be arranged to define first and second fluid sumps 25 and 26, first and second fluid introduction passages 81 and 82, and the fluid supply and return passages between first and second fluid sumps 25 and 26 via motor chamber 27. The upper and lower portions are symmetric with respect to a non-illustrated plane of symmetry e.g., a horizontal plane on which axes of input shaft 43, counter shaft 50 and axle 121 are disposed. Due to the upper and lower symmetry of transaxle casing 122 (and motor casing 28), first and second fluid sumps 25 and 26, first and second fluid introduction passages 81 and 82 and the fluid supply and return passages between first and second fluid sumps 25 and 26 via motor chamber 27 are ensured regardless of whether transaxle 2B is arranged to extend axle 121 leftward or is vertically reversed right to left so as to extend axle 121 rightward.

Figure 13:
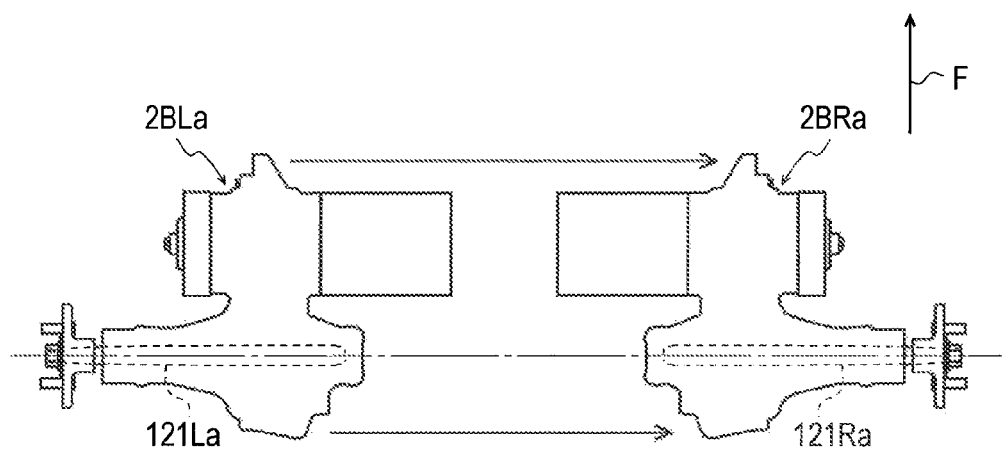
FIG. 13 is a schematic plan view of another arrangement of the pair of electric transaxles 2B.

Therefore, two transaxles 2B can be arranged as shown in FIG. 13 so as to provide differentially rotatable left and right axles 121 in a vehicle. One transaxle 2B is disposed to have axle 121 extending leftward from transaxle casing 122 so as to serve as left transaxle 2BLa. The other transaxle 2B corresponds to left transaxle 2BLa vertically reversed right to left so as to serve as right transaxle 2BRa having axle 121 extended rightward from transaxle casing 122. Axles 121 of left and right transaxles 2BLa and 2Bra are disposed coaxially to each other, so as to serve as left and right axles 121 of the vehicle. In spite of the vertical reverse, first and second fluid sumps 25 and 26, first and second fluid introduction passages 81 and 82 and the fluid supply and return passages between first and second fluid sumps 25 and 26 via motor chamber 27 are ensured in transaxle casing 122 of each of left and right transaxles 2BLa and 2BRa.

The arrangement shown in FIG. 13 is applicable so that both left and right transaxles 2BLa and 2BRa have respective electric motors 19 forward (or rearward) from respective axles 121, in comparison with the arrangement shown in FIG. 12 that is applicable so that one of transaxles 2BL and 2BR has electric motor 19 forward from axle 121 and the other of transaxles 2BL and 2BR has electric motor 19 rearward from axle 121.

In this way, each transaxle 2B can selectively serve as either the left transaxle having leftward extended axle 121 or the right transaxle having rightward extended axle 121, and can selectively serve as either the transaxle having electric motor 19 forward from axle 121 or the transaxle having axle 121 forward from electric motor 19, thereby being adaptable to various designed vehicles and progressing standardization of component parts.

It is further understood by those skilled in the art that the foregoing description is given of preferred embodiments of the disclosed apparatus and that various changes and modifications may be made in the invention without departing from the scope thereof defined by the following claims.

What is claimed is:

1. An electric transaxle comprising:
a transaxle casing defining a gear chamber therein;
an electric motor including a motor casing attached to the transaxle casing, wherein the motor casing defines a motor chamber therein, and wherein a component of the electric motor is disposed in the motor chamber;
an axle supported by the transaxle casing;
a gear mechanism disposed in the gear chamber so as to transmit power from the electric motor to the axle;
a first fluid sump provided in the gear chamber, wherein at least a part of the gear mechanism is submerged in the first fluid sump;
a second fluid sump to which fluid of the first fluid sump raised by driving the gear mechanism is supplied;
a first fluid introduction passage used to introduce the fluid raised from the first fluid sump to the second fluid sump when the axle is rotated in a forward traveling direction; and
a second fluid introduction passage used to introduce the fluid raised from the first fluid sump to the second fluid sump when the axle is rotated in a backward traveling direction,
wherein the transaxle casing includes symmetric portions such that either one of the symmetric portions of the transaxle casing define a lower portion of the gear chamber for providing the first fluid sump, wherein the electric transaxle includes symmetric reservoirs such that either one of the symmetric reservoirs serves as the second fluid sump, and wherein the electric transaxle includes symmetric guides each of which defines the first and second introduction fluid passages, such that either one of the symmetric guides is used for introducing fluid raised from the first fluid sump to the second fluid sump.
wherein the symmetric portions of the transaxle casing the symmetric reservoirs and the symmetric guides are symmetric with respect to a plane along a length of the transaxle casing.

2. The electric transaxle according to claim 1, wherein the transaxle casing and the motor casing are formed so as to supply fluid of the second fluid sump to the motor chamber, and so as to return fluid from the motor chamber to the first fluid sump.

3. The electric transaxle according to claim 2, wherein the motor casing has a fluid passage for supplying fluid from the second fluid sump to the motor chamber or for returning fluid from the motor chamber to the first fluid sump, and wherein the fluid passage is formed in only an end portion of the motor casing directly attached to the transaxle casing.

4. The electric transaxle according to claim 1, wherein the transaxle casing and the motor casing are formed with symmetric fluid passages such that one of the symmetric fluid passages is used for supplying fluid of the second fluid sump to the motor chamber, and such that the other of the symmetric fluid passages is used for returning fluid from the motor chamber to the first fluid sump.

5. The electric transaxle according to claim 4, wherein portions of the symmetric fluid passages defined by the motor casing are formed in only an end portion of the motor casing directly attached to the transaxle casing.

6. The electric transaxle according to claim 1, wherein the symmetric portions of the transaxle casing, the symmetric reservoirs and the symmetric guides are symmetric with respect to a horizontal plane of symmetry.

7. The electric transaxle according to claim 6, wherein the axle extends outward from only one of right and left side portions of the transaxle casing.

8. The electric transaxle according to claim 1, wherein the transaxle casing has opposite side portions, and wherein the electric motor is selectively attached to one of the opposite side portions of the transaxle casing so as to be drivingly connected to the gear mechanism.

* * * * *